(12) United States Patent
Zheng

(10) Patent No.: US 7,365,967 B2
(45) Date of Patent: Apr. 29, 2008

(54) COLLAPSIBLE STRUCTURES HAVING ENHANCEMENTS

(75) Inventor: Yu Zheng, Walnut, CA (US)

(73) Assignee: Patent Category Corp., Walnut, CA (US)

( * ) Notice: Subject to any disclaimer, the term of this patent is extended or adjusted under 35 U.S.C. 154(b) by 65 days.

(21) Appl. No.: 11/391,777

(22) Filed: Mar. 28, 2006

(65) Prior Publication Data
US 2006/0164798 A1 Jul. 27, 2006

Related U.S. Application Data

(60) Continuation of application No. 10/963,277, filed on Oct. 12, 2004, now Pat. No. 7,031,147, which is a continuation of application No. 10/795,155, filed on Mar. 4, 2004, now Pat. No. 6,856,504, which is a continuation of application No. 10/236,320, filed on Sep. 5, 2002, now Pat. No. 6,714,407, which is a division of application No. 09/736,004, filed on Dec. 13, 2000, now Pat. No. 6,449,147, which is a continuation-in-part of application No. 09/562,724, filed on May 1, 2000, now Pat. No. 6,560,095.

(51) Int. Cl.
*G06F 1/16* (2006.01)
(52) U.S. Cl. .................. 361/680; 400/472; 341/22
(58) Field of Classification Search .............. 361/680
See application file for complete search history.

(56) References Cited

U.S. PATENT DOCUMENTS

| | | | |
|---|---|---|---|
| 4,066,851 A * | 1/1978 | White et al. ............ 361/680 |
| 4,075,702 A | 2/1978 | Davies | |
| 4,658,298 A | 4/1987 | Takada et al. | |
| 4,815,784 A | 3/1989 | Zheng | |
| 4,825,892 A | 5/1989 | Norman | |
| 5,024,262 A | 6/1991 | Huang | |
| 5,137,044 A | 8/1992 | Brady | |
| 5,195,551 A | 3/1993 | Ju | |
| 5,278,734 A | 1/1994 | Ferber | |
| 5,295,089 A * | 3/1994 | Ambasz ............ 361/681 |
| 5,305,181 A | 4/1994 | Schultz | |
| 5,337,772 A | 8/1994 | Habchi | |
| 5,370,145 A | 12/1994 | Wu | |
| 5,371,657 A | 12/1994 | Wiscombe | |
| 5,455,749 A | 10/1995 | Ferber | |
| 5,553,908 A | 9/1996 | Shink | |
| 5,567,037 A | 10/1996 | Ferber | |
| 5,579,799 A | 12/1996 | Zheng | |
| 5,607,054 A | 3/1997 | Hollingsworth | |
| 5,626,948 A | 5/1997 | Ferber et al. | |
| RE35,571 E | 7/1997 | McLeese | |
| 5,642,750 A | 7/1997 | Brown et al. | |
| 5,671,479 A | 9/1997 | Dedrick | |
| 5,772,293 A | 6/1998 | Hughes | |

(Continued)

*Primary Examiner*—Lisa Lea-Edmonds
(74) *Attorney, Agent, or Firm*—Raymond Sun

(57) ABSTRACT

Collapsible structures are provided with enhancements and other features that impart additional utility or amusement value to the basic underlying structure. The collapsible structure has at least one foldable frame member having a folded and an unfolded orientation, and with a fabric material covering portions of the frame member to form a panel when the frame member is in the unfolded orientation. An electrical component can attached to the fabric material, and an electrical coupling connected to the electrical component. Alternatively, a two-dimensional or three-dimensional object can be attached to the fabric material.

6 Claims, 33 Drawing Sheets

U.S. PATENT DOCUMENTS

| | | |
|---|---|---|
| 5,778,915 A | 7/1998 | Zheng |
| 5,800,067 A | 9/1998 | Easter |
| 5,808,865 A | 9/1998 | Alves |
| 5,816,278 A | 10/1998 | Kim |
| 5,845,697 A | 12/1998 | Zheng |
| 5,887,723 A | 3/1999 | Myles et al. |
| 5,970,661 A | 10/1999 | Bishop et al. |
| 5,973,420 A | 10/1999 | Kaiserman et al. |
| 6,006,772 A | 12/1999 | Zheng |
| 6,032,685 A | 3/2000 | Zheng |
| 6,048,043 A | 4/2000 | Kaspar |
| 6,048,044 A | 4/2000 | Biggel et al. |
| 6,098,349 A | 8/2000 | Zheng |
| 6,109,281 A | 8/2000 | Lowenthal |
| 6,109,282 A | 8/2000 | Yoon |
| 6,168,331 B1 * | 1/2001 | Vann ......................... 400/472 |
| 6,259,006 B1 * | 7/2001 | Parienti ........................ 84/171 |
| 6,263,617 B1 | 7/2001 | Turcot et al. |
| 6,265,993 B1 * | 7/2001 | Johnson ......................... 341/22 |

* cited by examiner

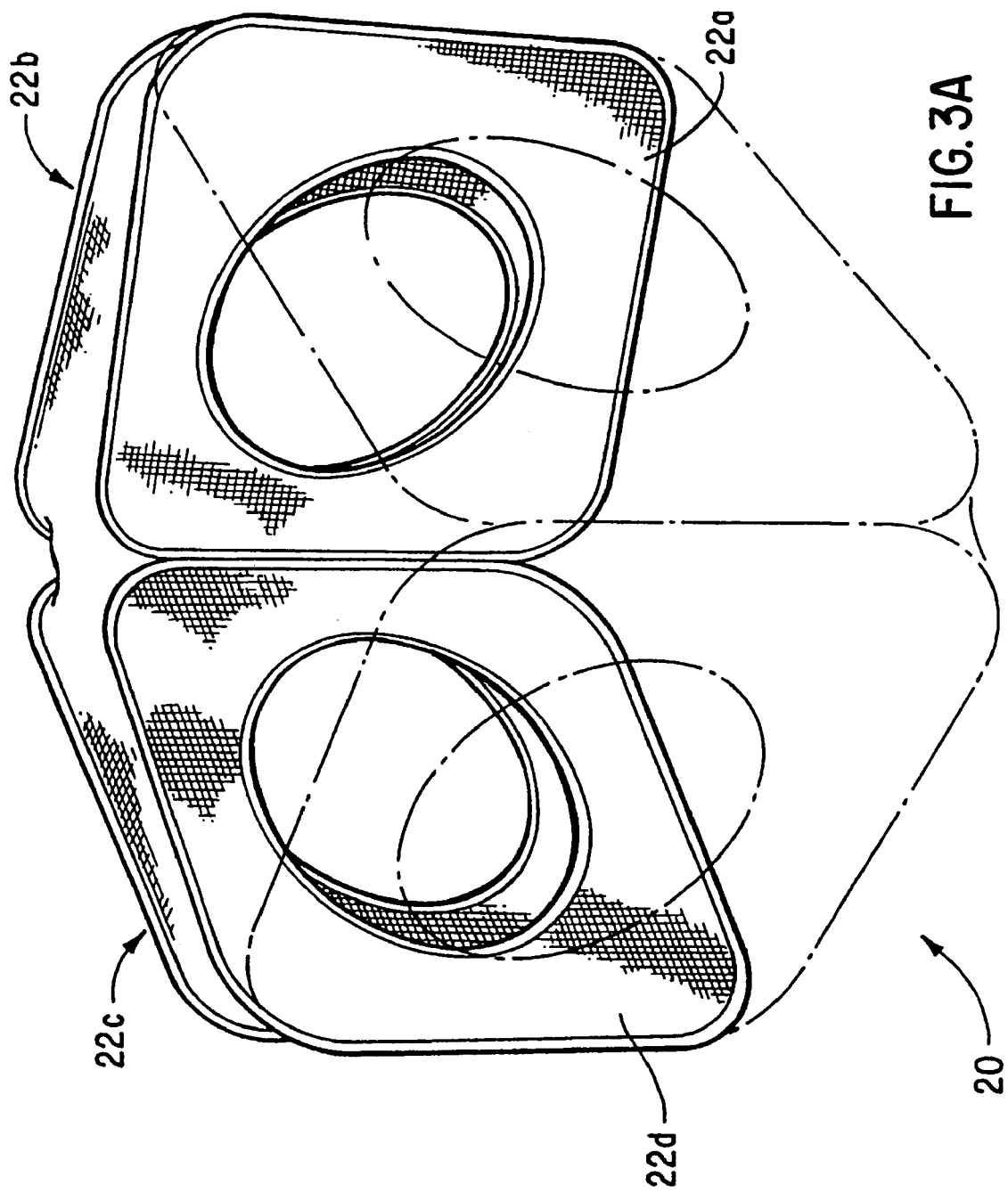

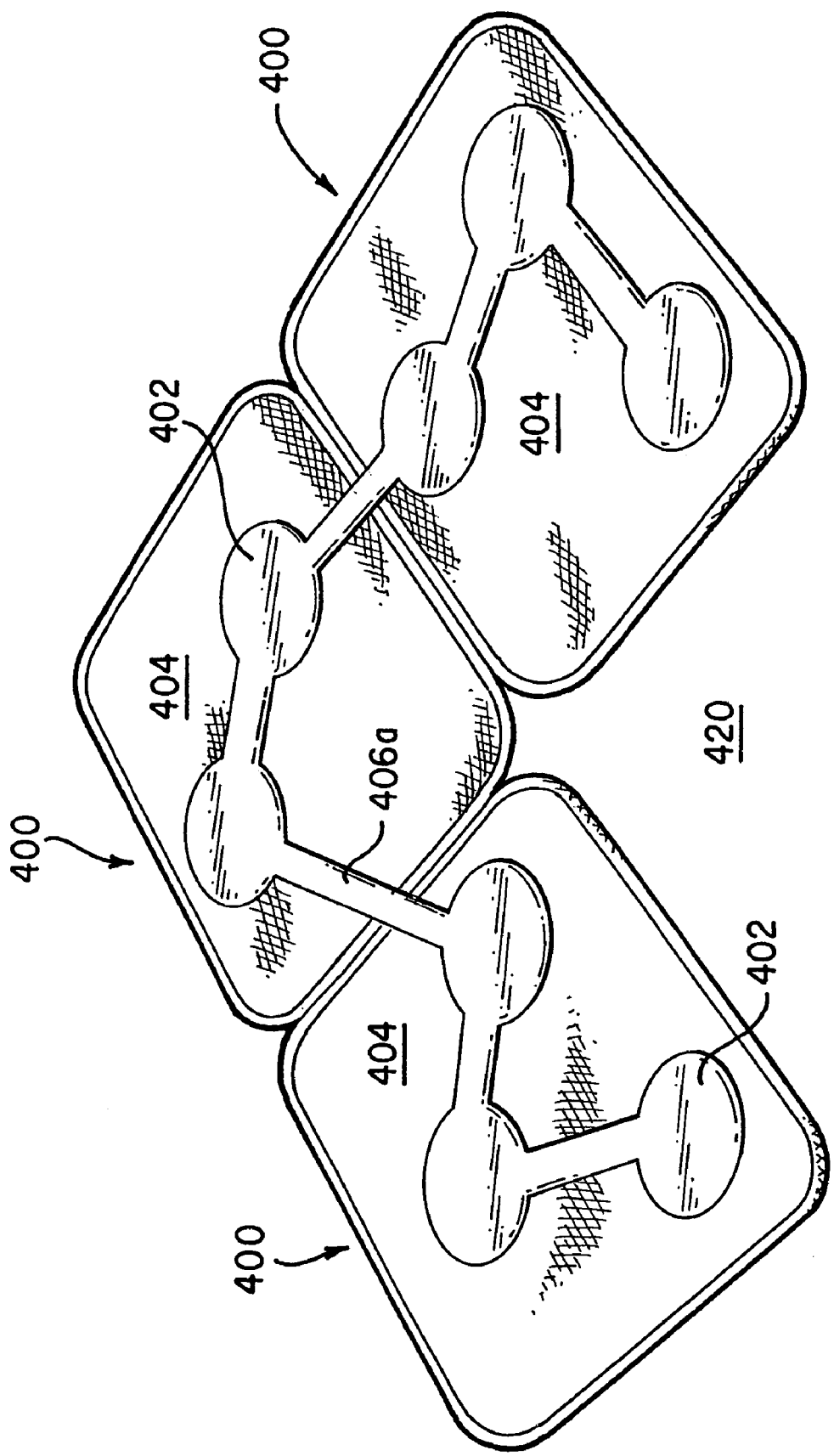

COLLAPSIBLE STRUCTURES HAVING ENHANCEMENTS

RELATED CASES

This is a continuation-in-part of Ser. No. 10/963,277, filed Oct. 12, 2004 now U.S. Pat. No. 7,031,147, which is a continuation of Ser. No. 10/795,155, filed Mar. 4, 2004, now U.S. Pat. No. 6,856,504, which is a continuation of Ser. No. 10/236,320, filed Sep. 5, 2002, now U.S. Pat. No. 6,714,407, which is a division of Ser. No. 09/736,004, filed Dec. 13, 2000, now U.S. Pat. No. 6,449,147, which is in turn a continuation-in-part of Ser. No. 09/562,724, entitled "Collapsible Structures Having Enhancements", filed May 1, 2000 now U.S. Pat. No. 6,560,095, whose disclosures are incorporated by this reference as though fully set forth herein.

BACKGROUND OF THE INVENTION

1. Field of the Invention

The present invention relates to collapsible structures, and in particular, to collapsible structures which include enhancements and other added features. The collapsible structures may be twisted and folded to reduce the overall size of the structures to facilitate convenient storage and use.

2. Description of the Prior Art

There are presently many collapsible structures that are being provided for use by children and adults. Examples of these collapsible structures are illustrated in the following patents: U.S. Pat. No. 5,816,954 (Zheng), U.S. Pat. No. 6,006,772 (Zheng), U.S. Pat. No. 5,778,915 (Zheng), U.S. Pat. No. 5,467,794 (Zheng), U.S. Pat. No. 5,975,101 (Zheng), U.S. Pat. No. 5,722,446 (Zheng), U.S. Pat. No. 4,858,634 (McLeese), U.S. Pat. No. 4,825,592 (Norman), U.S. Pat. No. 5,964,533 (Ziglar), U.S. Pat. No. 5,971,188 (Kellogg et al.), and U.S. Pat. No. 5,038,812 (Norman), among others. These collapsible structures are supported by one or more frame members that can be twisted and folded to reduce the overall size of the structure. These collapsible structures can be used in a wide variety of applications, such as containers, tents, play structures, executive toys, shelters, sports structures, and others. As a result, collapsible structures have become very popular.

Even though these collapsible structures exhibit surprising versatility in their utility and wide-ranging applications, the consumer is always demanding greater enhancements, better and more features, added convenience, and other related factors. Thus, there remains a need to provide collapsible structures that have increased variety of play, entertainment value, and utility.

SUMMARY OF THE DISCLOSURE

The present invention provides collapsible structures having enhancements and other features that impart additional utility or amusement value to the basic underlying structure. The structure of the present invention has one or more foldable frame members, with each frame member having a folded and an unfolded orientation, and with a fabric material covering portions of the frame member to form a panel when the frame member is in the unfolded orientation.

In one embodiment of the present invention, an electrical component is attached to the fabric material, and an electrical coupling is connected to the electrical component.

In another embodiment of the present invention, a two-dimensional or three-dimensional object is attached to the fabric material.

BRIEF DESCRIPTION OF THE DRAWINGS

FIGS. 3(A) through 3(E) illustrate how the collapsible structure of FIG. 1 may be twisted and folded for compact storage.

FIGS. 20 and 21A are perspective views of collapsible structures according to different embodiments of the present invention.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The collapsible structures according to the present invention are provided with enhancements and other features that impart additional utility or amusement value to the basic underlying structure. These enhancements and features can include two-dimensional and three-dimensional objects, books, graphics, electrical appliances and components, computing devices, and interactive games, among others.

Figure 1:
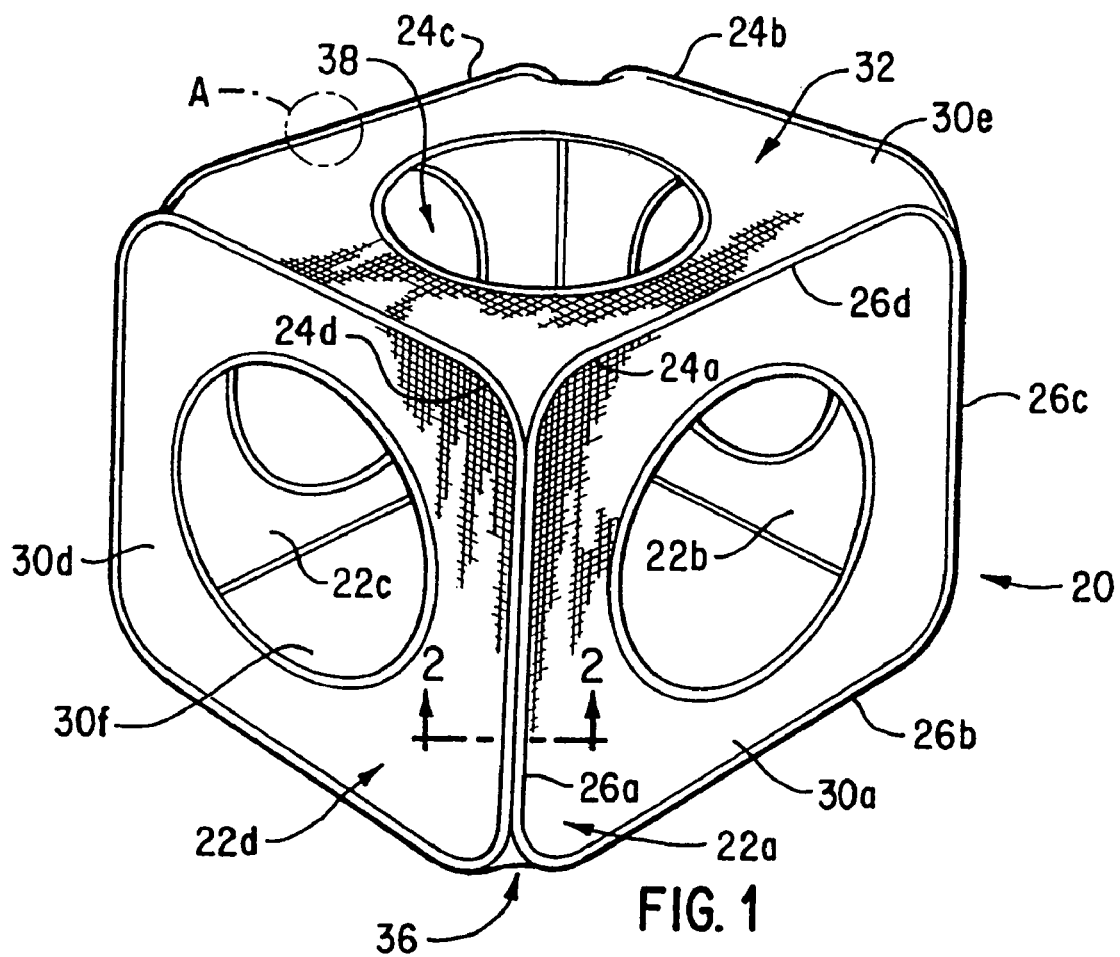
FIG. 1 is a perspective view of a collapsible structure according to one embodiment of the present invention.
Figure 1A:
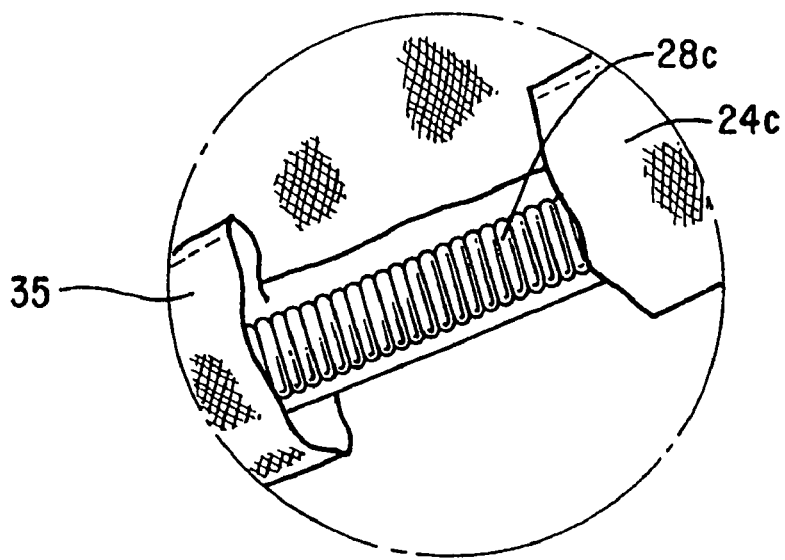
FIG. 1A is a partial cut-away view of the section A of the structure of FIG. 1 illustrating a frame member retained within a sleeve.

FIGS. 1 and 1A illustrate a possible basic collapsible structure 20 according to the present invention. According to the present invention, enhancements and features will be added to the structure 20 of FIG. 1, and this will be illustrated in FIG. 4 and the other embodiments herein. However, for purposes of simplifying the description, the structure 20 is illustrated in FIGS. 1-3E in its most basic form without any enhancements or features.

Referring to FIG. 1, the structure 20 has four side panels 22a, 22b, 22c and 22d connected to each other to encircle an enclosed space. Each side panel 22a, 22b, 22c and 22d has four sides, a left side 26a, a bottom side 26b, a right side 26c and a top side 26d. Each side panel 22a, 22b, 22c and 22d has a continuous frame retaining sleeve 24a, 24b, 24c or 24d, respectively, provided along and traversing the four edges of its four sides 26a, 26b, 26c and 26d. A continuous frame member 28a, 28b, 28c or 28d is retained or held within each frame retaining sleeve 24a, 24b, 24c or 24d, respectively, to support each side panel 22a, 22b, 22c and 22d. Only the frame member 28c is shown in FIG. 1A; the other frame members 28a, 28b and 28d are not shown but are the same as frame member 28c.

The continuous frame members 28a, 28b, 28c and 28d may be provided as one continuous loop, or may comprise a strip of material connected at both ends to form a continuous loop. The continuous frame members 28a, 28b, 28c and 28d can be formed of flexible coilable steel having a memory, although other materials such as plastics, or a combination of plastics and metal, may also be used. The frame members should be made of a material which is relatively strong and yet is flexible to a sufficient degree to allow it to be coiled. Thus, each frame member 28a, 28b, 28c and 28d is capable of assuming two positions or orientations, an open or expanded position such as shown in FIG. 1, or a folded position in which the frame member is collapsed into a size which is much smaller than its open position (see FIG. 3(E)). It is also possible for the principles of the present invention to be utilized with frame members that do not have a memory characteristic (i.e., not foldable or coilable).

Fabric or sheet material 30a, 30b, 30c and 30d extends across portions of each side panel 22a, 22b, 22c and 22d, respectively, and is held taut by the respective frame members 28a, 28b, 28c and 28d when in its open position. The term fabric is to be given its broadest meaning and should be made from strong, lightweight materials and may include woven fabrics, sheet fabrics or even films. The fabric should be water-resistant and durable to withstand the wear and tear associated with rough treatment by children. The frame members 28a, 28b, 28c and 28d may be merely retained within the respective frame retaining sleeves 24a, 24b, 24c and 24d, respectively, without being connected thereto. Alternatively, the frame retaining sleeves 24a, 24b, 24c and 24d may be mechanically fastened, stitched, fused, or glued to the frame members 28a, 28b, 28c and 28d, respectively, to retain them in position.

Figure 2A:
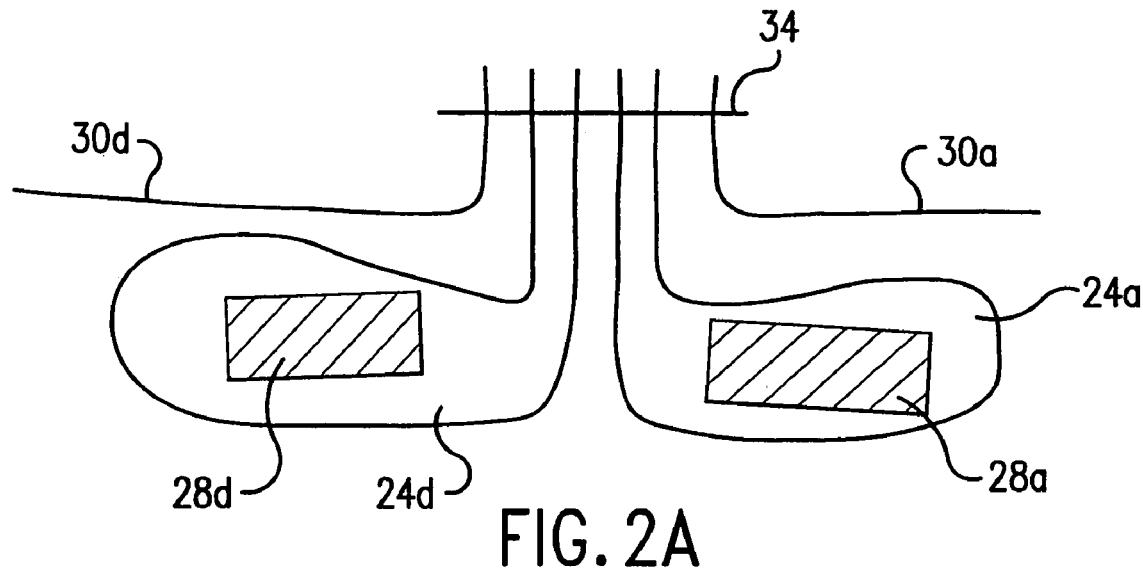
FIG. 2A is a cross-sectional view of a first preferred connection between two adjacent panels of the structure of FIG. 1 taken along line 2-2 thereof.

FIG. 2A illustrates one preferred connection for connecting adjacent edges of two side panels 22a and 22d of FIG. 1. The fabric pieces 30a and 30d are stitched at their edges by a stitching 34 to the respective sleeves 24a and 24d. Each sleeve 24a and 24d may be formed by folding a piece of fabric. The stitching 34 also acts as a hinge for the side panels 22a and 22d to be folded upon each other, as explained below. The connections for the three other pairs of adjacent edges may be identical. Thus, the connections on the left side 26a and the right side 26c of each side panel 22a, 22b, 22c and 22d act as hinge connections for connecting an adjacent side panel.

At the top side 26d and the bottom side 26b of each side panel 22a, 22b, 22c and 22d in FIG. 1, where there is no hinge connection to an adjacent side panel, the frame retaining sleeve 24a, 24b, 24c or 24d may be formed by merely folding over the corresponding fabric piece and applying a stitching 35 (see FIG. 1A). The fabric piece for the corresponding side panel may then be stitched to the sleeve.

Figure 2B:
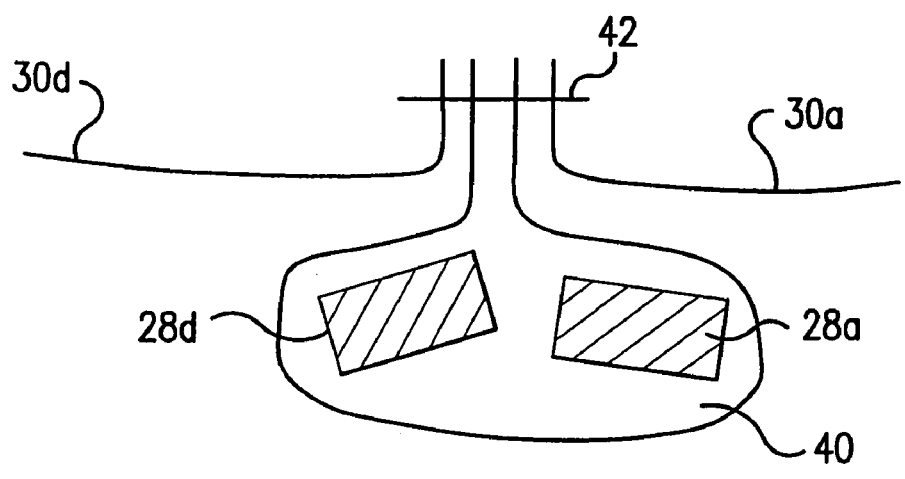
FIG. 2B is a cross-sectional view of a second preferred connection between two adjacent panels of the structure of FIG. 1 taken along line 2-2 thereof.

FIG. 2B illustrates a second preferred connection for connecting adjacent edges of two side panels 22a and 22d of FIG. 1. As in the connection of FIG. 2A, the fabric pieces 30a and 30d are folded over at their edges at bottom side 26b and top side 26d to define the respective sleeves 24a and 24d. However, the frame retaining sleeves 24a and 24d converge at, or are connected to, one sleeve portion which interconnects side panels 22a and 22d to form a singular frame retaining sleeve 40 which retains the frame members 28a and 28d. Sleeve 40 of FIG. 2B may be formed by providing a tubular fabric, or by folding a piece of fabric, and applying a stitching 42 to its edges to connect the sleeve 40 to the fabric pieces 30a and 30d. Stitching 42 acts as a hinge for the side panels 22a and 22d. The connections for the three other pairs of adjacent edges may be identical.

Referring back to FIG. 1, an upper panel 32, which can be made of fabric, may also be connected to the upper edge 26d of each side panel 22a, 22b, 22c and 22d. Likewise, a lower panel 36, which can be made of fabric 30f, may also be connected to the bottom edge 26b of each side panel 22a, 22b, 22c and 22d. The upper panel 32 and the lower panel 36 can be made of the same type of fabric as the side panels 22a, 22b, 22c and 22d. Each structure 20 can have at least the four side panels 22a, 22b, 22c and 22d, with the upper and lower panels 32 and 36 being optional.

Openings 38 may be provided in one or more of the panels 22a, 22b, 22c, 22d, 32 and 36. These openings 38 may be of any shape (e.g., triangular, circular, rectangular, square, diamond, etc.) and size and are designed, for example, to allow an individual to crawl through them to enter or to exit the structure 20.

Even though each panel 22a, 22b, 22c, 22d is illustrated as having four sides, it is possible to configure any of these panels with any shape having different number of sides, including sides that have varying degrees of curvature. For purposes of the present invention, a "side" can have varying degrees of curvature and is not restricted to merely a straight configuration. As a result, each side 26a, 26b, 26c, 26d can be partially or completely curved. Thus, the structure 20 of the present invention may take a variety of external shapes. However, each side panel of the structure 20, regardless of its shape, is supported by at least one continuous frame member.

Figure 3B:
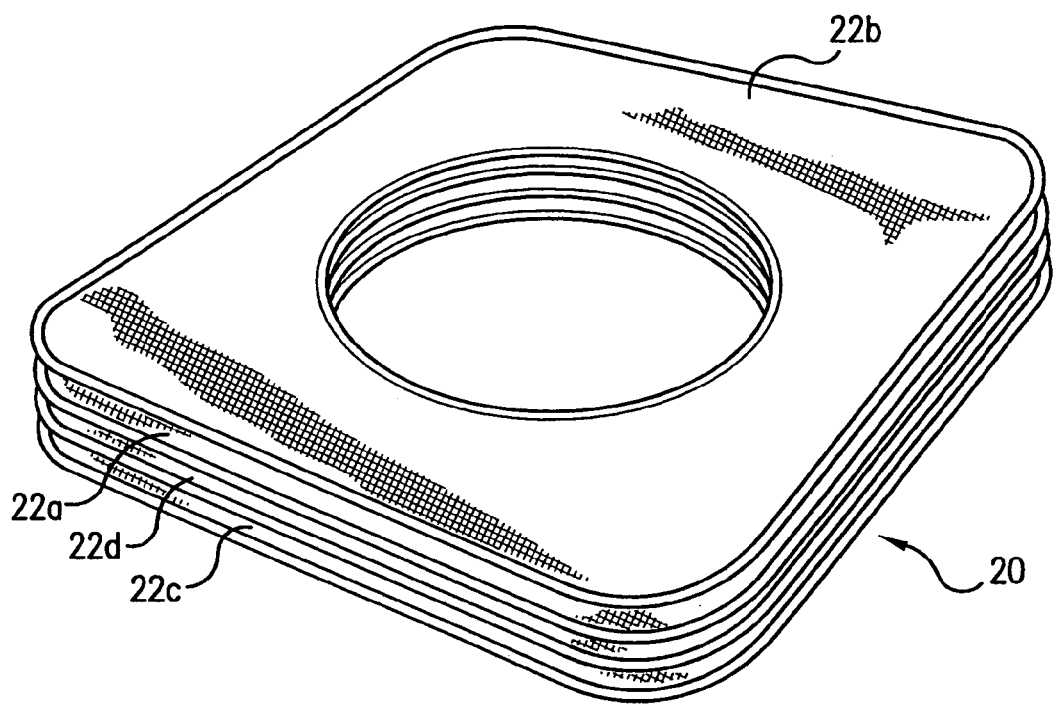
Figure 3C:
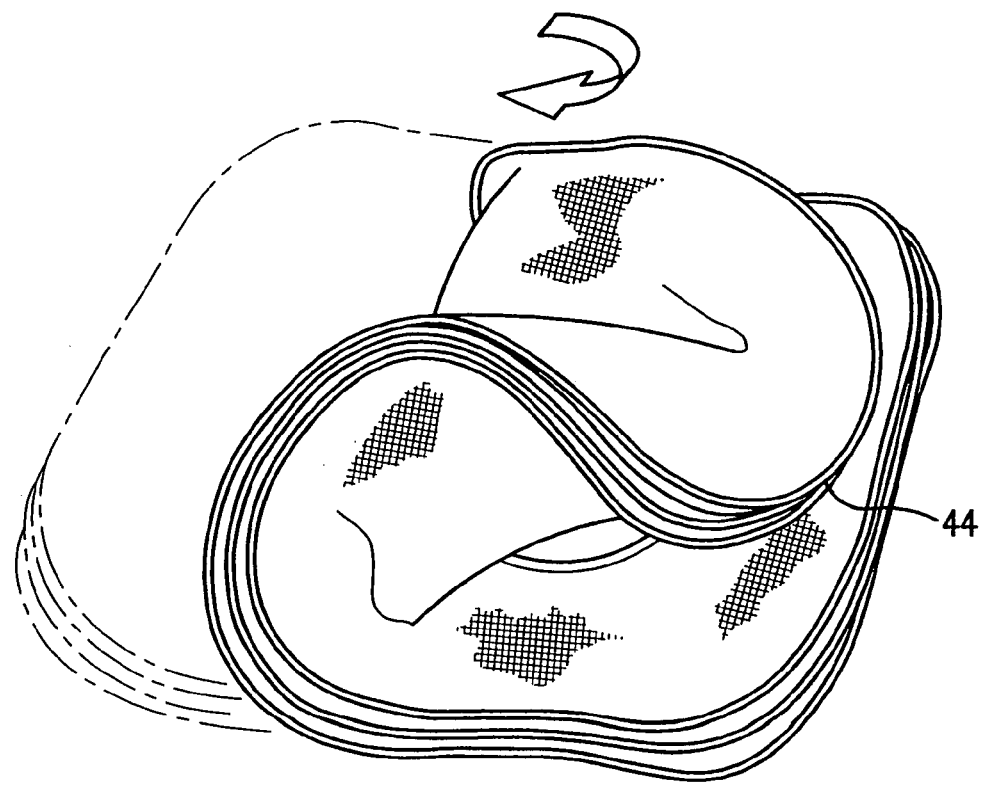
Figure 3D:
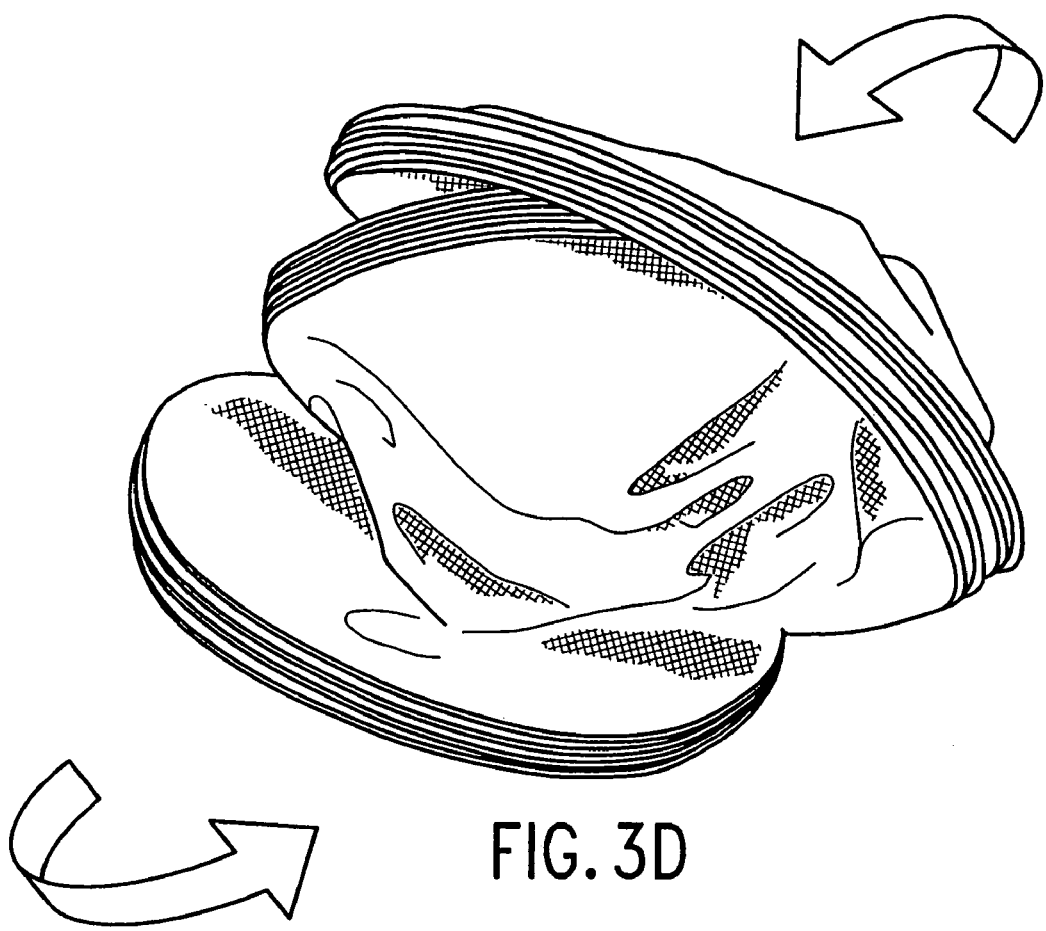
Figure 3E:
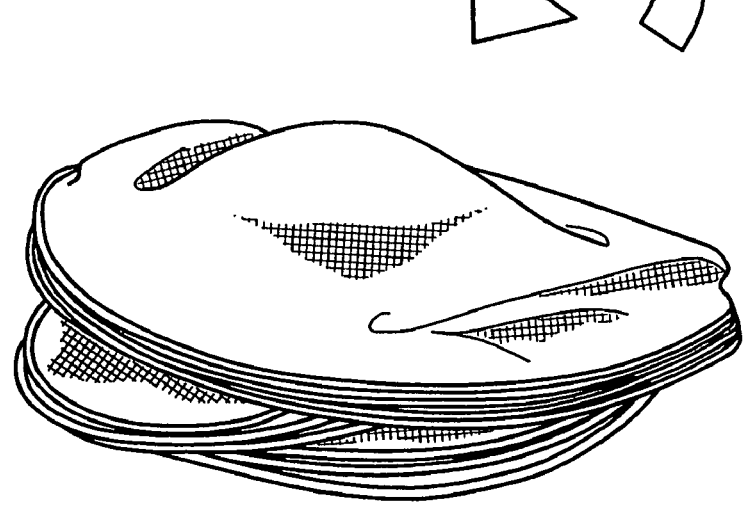

FIGS. 3(A) through 3(E) describe the various steps for folding and collapsing the structure 20 of FIG. 1 for storage. In FIG. 3(A), the first step consists of pushing in side panels 22a and 22d such that side panel 22d collapses against side panel 22c and side panel 22a collapses against side panel 22b. Then, in the second step shown in FIG. 3(B), the two side panels 22a and 22b are folded so as to be collapsed upon the two side panels 22c and 22d to form a stack of side panels 22b, 22a, 22d, 22c (in one possible order). The structure is then twisted and folded to collapse the frame members and side panels into a smaller shape. In the third step shown in FIG. 3(C), the opposite border 44 of the structure is folded in upon the previous fold to further collapse the frame members with the side panels. As shown in FIG. 3(D), the fourth step is to continue the collapsing so that the initial size of the structure is reduced. FIG. 3(E) shows the fifth step with the frame members and side panels collapsed on each other to provide for a small essentially compact configuration having a plurality of concentric frame members and layers of the side panels so that the collapsed structure has a size which is a fraction of the size of the initial structure.

To re-open the structure 20 to its expanded configuration, the combined stack of side panels is unfolded. The memory (i.e., spring-load) of the frame members will cause the frame members to uncoil on their own and to quickly expand the panels to their expanded configuration shown in FIG. 3B. The same principle can be applied to re-open all the other embodiments of the present invention.

Figure 4:
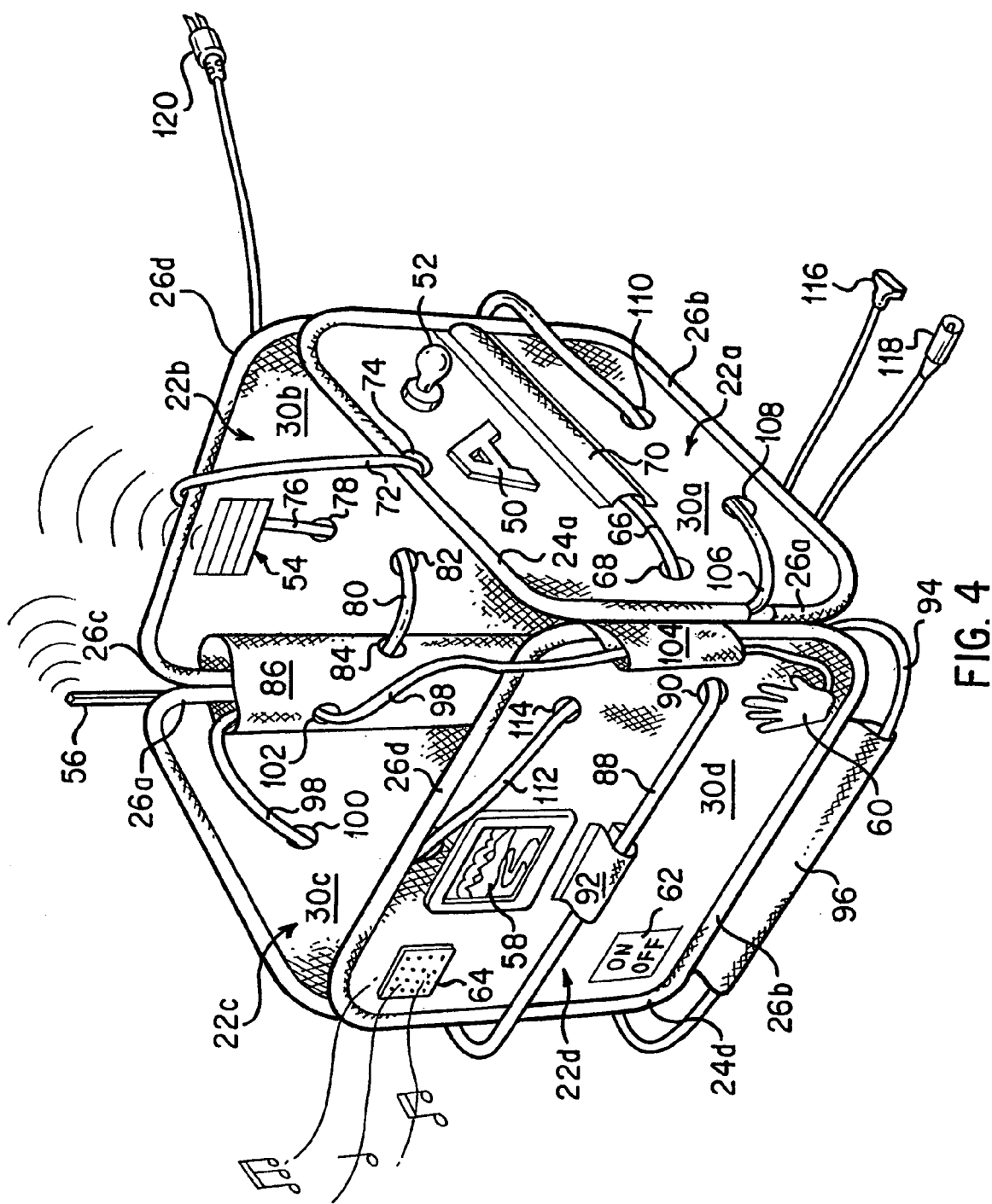
FIG. 4 is a perspective view of the collapsible structure of FIG. 1 having additional enhancements and features.

FIG. 4 illustrates the structure 20 having numerous enhancements and features incorporated therein. For example, the side panel 22a can have a three-dimensional design 50 (in the form of a graphic "A") and a light bulb 52 attached to the outer surface of its fabric 30a, the side panel 22b can have an antenna 54 (e.g., a receiver) attached to the inner surface of its fabric 30b, another antenna 56 (e.g., a transmitter) can be attached to a side 26 of the side panel 22c, and the side panel 22d can have a video monitor or screen 58, a touch sensor 60, an on-off pad 62, and a speaker 64 attached to the outer surface of its fabric 30d. The screen 58 can even include a very thin microcomputer. The components of a microcomputer are well-known in the art, and the microcomputer 58 can be any conventional microcomputer having a processor (not shown), a memory (not shown), input buttons 135 (see FIG. 5) and a display 137 (see FIG. 5), among others, housed inside the frame or housing of the microcomputer 58.

Figure 5:
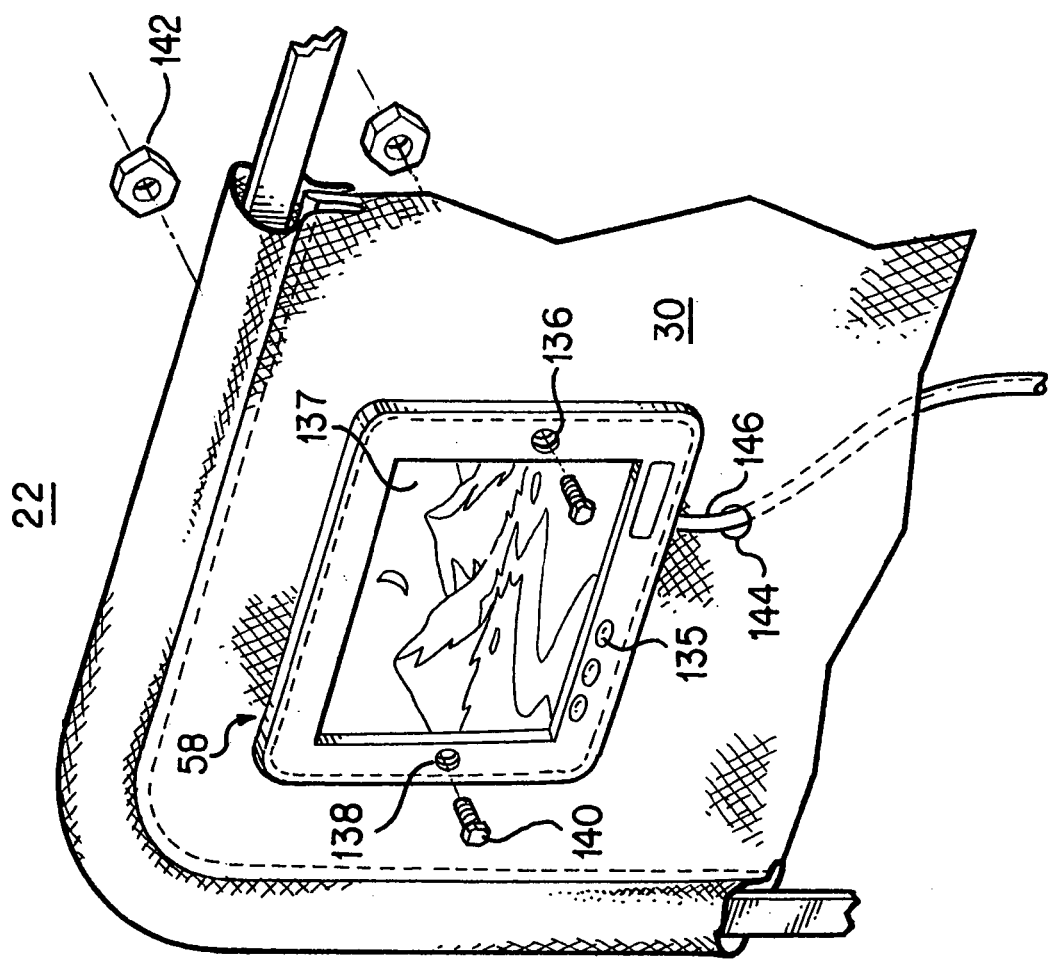
FIG. 5 is an enlarged front view illustrating how a screen is attached to a panel.
Figure 6:
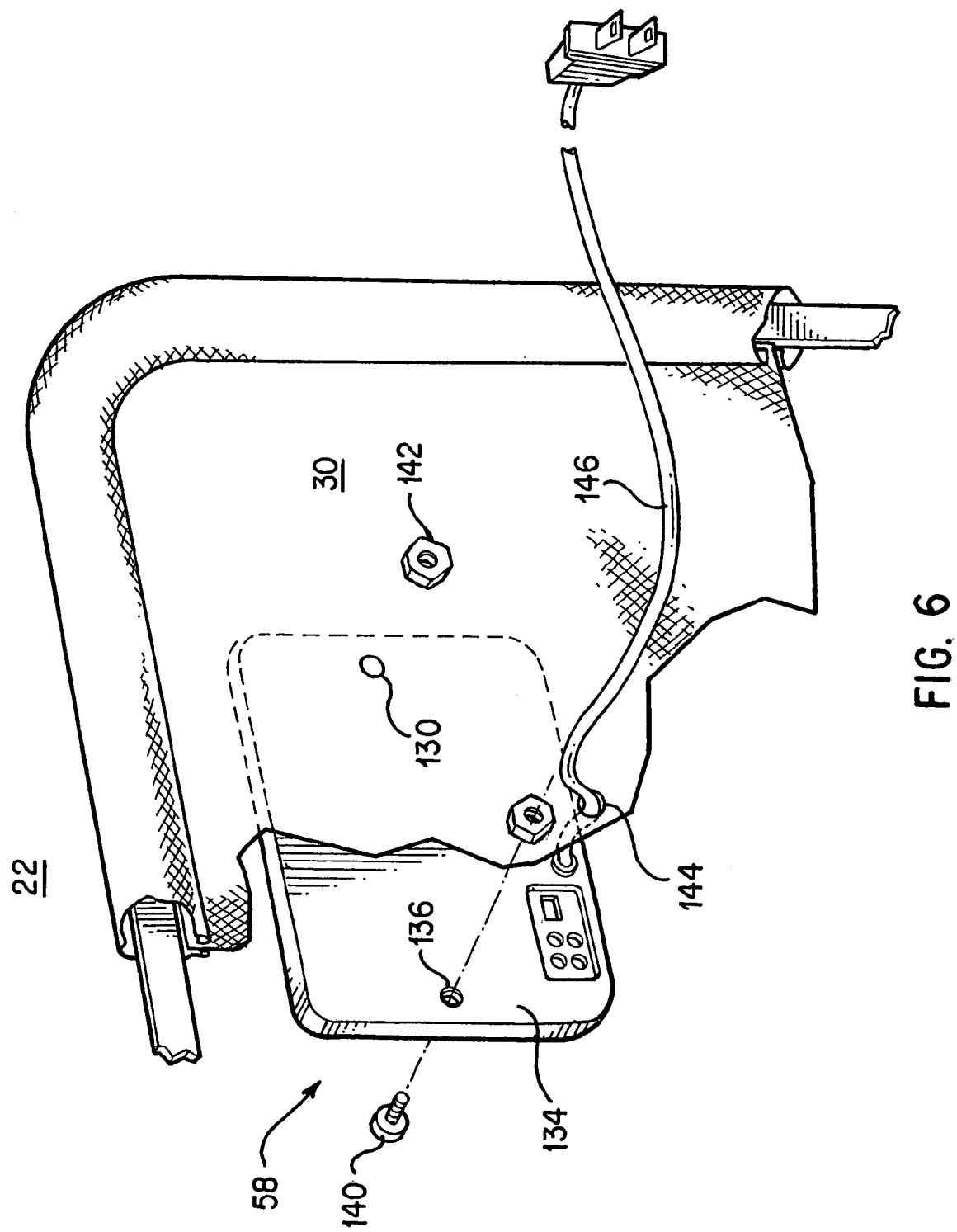
FIG. 6 is an enlarged rear view illustrating how the screen of FIG. 5 is attached to a panel.

A number of these features, such as the light bulb 52, antennas 54 and 56, screen 58, touch sensor 60, on-off pad 62, and speaker 64, are electrical appliances or components and need to be coupled to a power source to be driven, and may need to be coupled to processors for receiving and/or transmitting control, data or other signals. These electrical components can be attached to the fabric 30 of a side panel 22 by either stitching, by screws and bolts (such as illustrated in FIGS. 5 and 6 below), or any other known connection mechanisms, including those shown in FIGS. 9A and 9B. Wires can be coupled to these electrical components and power sources and processors for ensuring the transmission of power and signals therebetween. Some examples of these wires are illustrated in FIG. 4. Some of these wires can extend along the inner surfaces of the fabric 30 of any of the side panels 22, or along the outer surfaces of the fabric 30 of any of the side panels 22. Openings can be provided in the fabric 30 to allow wires to pass from an inner surface to an outer surface of the fabric 30. Wire sleeves can be provided on the fabric 30 or sides 26 of the panels 22 to house or retain portions of the wires. In addition, the wires can extend through portions of the frame retaining sleeves 24 of the panels 22.

For example, a wire 66 can extend from an opening 68 in the fabric 30a from the inner surface thereof and then through a sleeve 70 attached (e.g., by stitching) to the outer surface of the fabric 30a. The wire 66 then extends into the frame retaining sleeve 24a of the panel 22a and then onward to other portions of the structure 20. Another wire 72 can extend from another opening 74 in the fabric 30a from the inner surface thereof and then over a top side 26d of the panel 22b. Yet another wire 76 can extend from the antenna 54 along the inner surface of fabric 30b through an opening 78 in the fabric 30b to the outer surface thereof. Another wire 80 can extend through another opening 82 in the fabric 30b from the outer surface thereof and then through an opening 84 in a sleeve 86 that is attached (e.g., by stitching) adjacent the sides or edges 26c and 26a of panels 22b and 22c, respectively. The wire 80 can be a continuation of the wire 76. Yet another wire 88 can extend through an opening 90 in the fabric 30d from the inner surface thereof and then through a short sleeve 92 attached (e.g., by stitching) to the outer surface of the fabric 30d. The wire 88 can then extend around to the outer surface of the panel 22c. The wire 88 can even be a continuation of the wire 66. Yet another wire 94 can extend from the interior of the structure 20 and under the panel 22d to travel through a sleeve 96 that is attached (e.g., by stitching) to the frame retaining sleeve 24d along the bottom edge 26b. The wire 95 can then extend around to the outer surface of the panel 22c. Another wire 98 can extend through an opening 100 in the fabric 30c from the outer surface thereof and then through the sleeve 86 (via the top of the sleeve 86) and out of an opening 102 in the sleeve 86. The wire 98 can then extend over the top of the structure 20 and through another sleeve 104 that is attached (e.g., by stitching) to the frame retaining sleeve 24a along the side or edge 26a. The wire 98 can then exit the lumen of the sleeve 104 and be coupled to the touch sensor 60. Here again, the wire 98 can be a continuation of wire 88. Yet another wire 106 can extend from inside the frame retaining sleeve 24a along the side or edge 26a to the outer surface of the fabric 30a, from which it goes through an opening 108 in the fabric 30a to extend along the inner surface of fabric 30a to re-emerge along the outer surface thereof via another opening 110. The wire 106 can then extend along the outer surfaces of the panels 22a, 22b and 22c, and can even be an extension of the wire 88 described above. Another wire 112 can extend from inside the frame retaining sleeve 24d and along the side or edge 26d to the outer surface of the fabric 30d, from which it goes through an opening 114 in the fabric 30d.

Selected wires can also be coupled to a phone jack or modem 116, a cable connection 118, and a power plug 120. For example, the wire 82 can be coupled to the power plug 120.

FIGS. 5 and 6 illustrate how a lightweight video monitor or screen 58 can be attached to the fabric 30 of a side panel 22. As shown in FIG. 6, two holes 130 (only one is shown in FIG. 6, the other is aligned with opening 136) can be provided in the fabric 30. The screen 58 has a frame 134, with two openings 136 and 138 provided adjacent opposing sides of the frame 134 and aligned with the holes 130. A nut 140 can be threaded through each opening 136, 138 in the frame 134 and through the corresponding hole 130, and a bolt 142 can be secured to the nut 140 to complete the connection. Another hole 144 can be provided in the fabric 30 through which a cable or wire 146 can extend to the inner surface of the fabric 30.

The following is a non-limiting example illustrating how the structure 20 and its enhancements might operate. The user can press the on/off switch 62 to start or enable all or certain electronic devices, such as the sensor 60, the screen 58, and the speaker 64. Some of the wires described above would be used to electronically couple the sensor 60, the screen 58, and the speaker 64. For example, the wires 98, 88 and 112 (in that order) can be used to couple the sensor 60 and the screen 58, and other wires (not shown) provided along the inner surface of the fabric 30d of side panel 22d can be used to couple the on/off switch 62, the screen 58 and the speaker 64. The user can manipulate the sensor 60, or the buttons 135 (see FIG. 5) on the screen/computer 58, to control the operation of an application program stored in the memory of the screen/computer 58 to control the sounds emitted from the speaker 64. As another application or game, the user can manipulate the buttons 135 on the screen to select pre-defined games. The games could direct the user(s) or children (via voices emitted from the speaker 64) to perform specific tasks, such as touch the sensor 60, squeeze an item 50, run around the structure 20, or perform any other specific task, in a specific or random order. The variety and amusement value of these computer-programmed games will depend on the items, devices and features provided with the structure 20. The screen 58 can even be used to display the results of these games, which can be measured by, for example, the sensor 60 or other sensors provided around the structure 20.

As yet another example, these devices and features can provide the basis for educational games. For example, the speaker 64 can broadcast tasks that require a child to do the broadcasted task several times, and having the child count the number of times that the task has been performed.

As a further non-limiting example, the antennas 54 and 56, screen 58, touch sensor 60, on/off pad 62, and speaker 64 can even be the components that make up an interactive computer system that is capable of communicating (via wireless transmission) with other computing systems. Thus, the structure 20 can actually form an "interactive" or "computing" booth for a user, where the user can use the touch sensor 60 and buttons 135 as input devices, and the screen 58 as an output device, for playing games, doing word processing, surfing the Internet, and communicating with other computing systems. Other objects and devices that can be incorporated with the structure 20 including cellular phones, microphones, musical instruments, radios, zippers, snaps, tethered balls, squeeze items, pinwheels or spinning wheels, sockets, slap items (i.e., items that emit sounds when slapped), buckles, corks, whistles, pedals, and doorbells, among others. Thus, the structure 20 in FIG. 4 provides the user with much added utility, educational value, and play variety.

Figure 7:
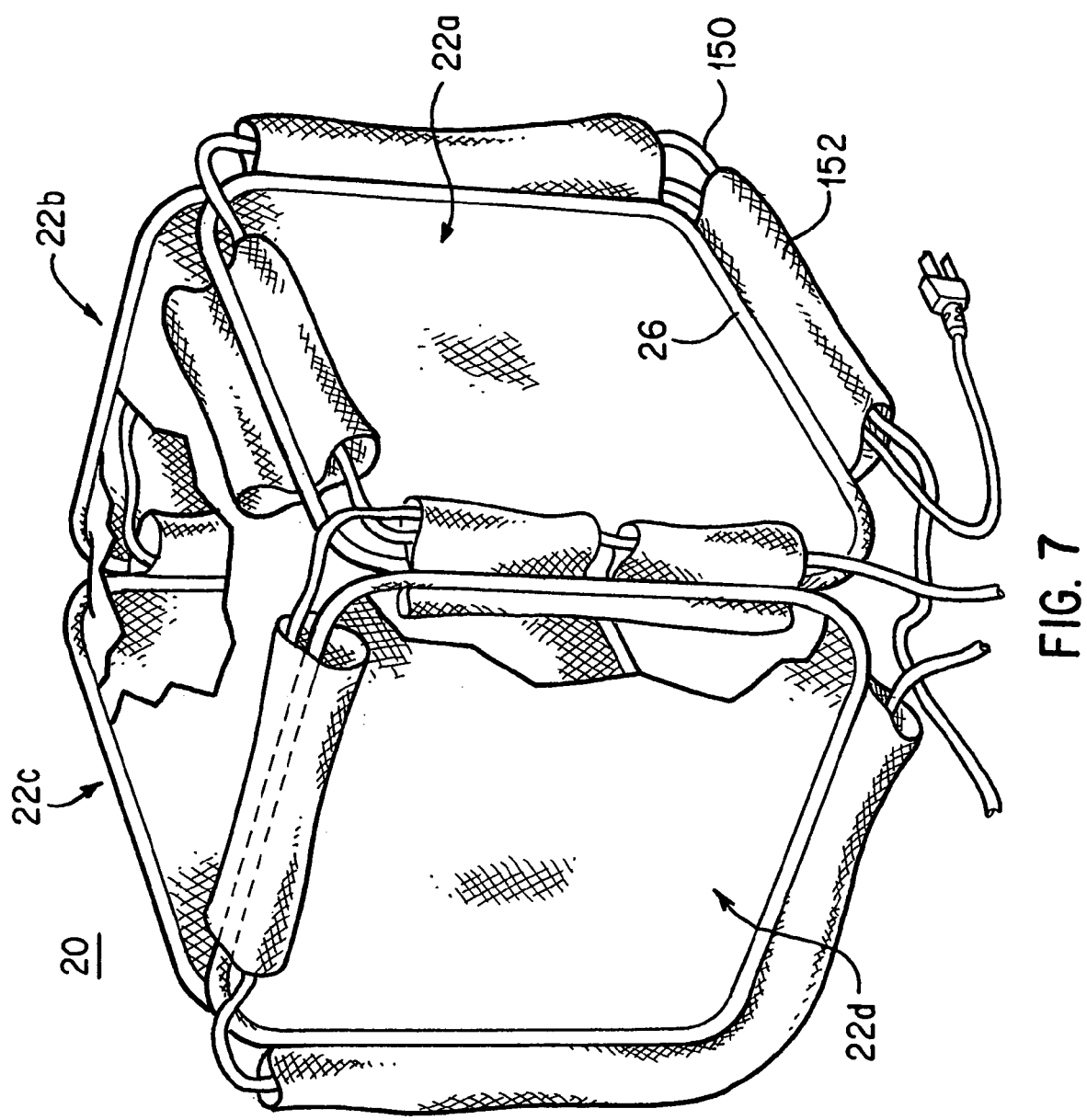
FIGS. 7-14 are perspective views of collapsible structures according to different embodiments of the present invention.

FIG. 7 illustrates modifications to the structure 20 shown in FIG. 4. In particular, instead of the wires extending across one or more side panels 22 as shown in FIG. 4, the wires (e.g., 150) in the structure of FIG. 7 can be retained inside sleeves (e.g., 152) that are attached to and extend along the sides or edges 26 of each side panel 22.

Figure 8:
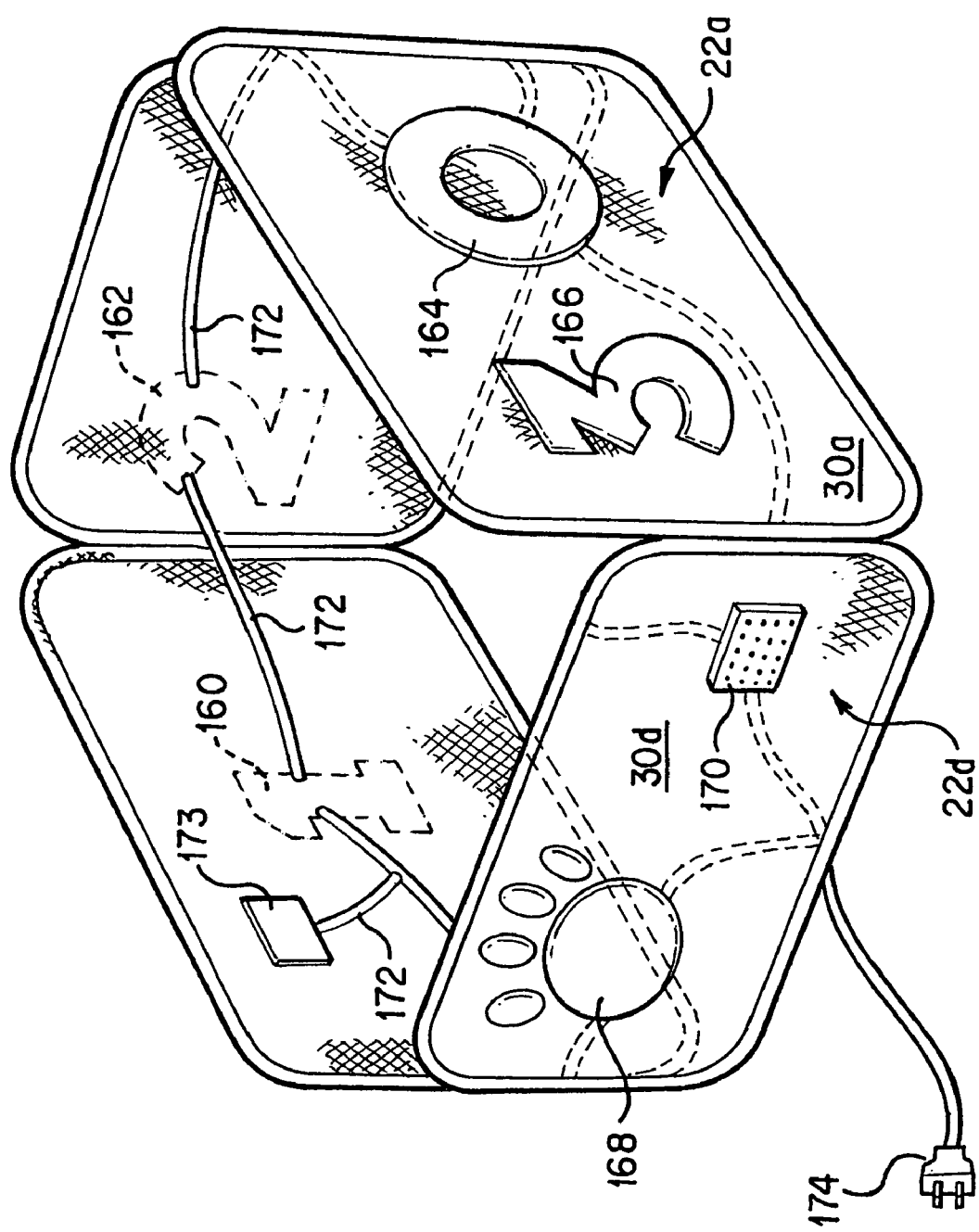

FIG. 8 illustrates another embodiment of the present invention, in which the structure 20 is provided with a different type of enhancement or feature. In FIG. 8, the structure 20 has a plurality of graphics or other objects that are provided on the fabric 30 of the respective side panels 22, with these graphics and objects capable of emitting light or sound. These graphics can be two-dimensional. For example, a plurality of graphics or objects 160, 162, 164, 166, 168, a speaker 170, and a processor 173 can be attached (e.g., by stitching, glue, screws, or the like) to the fabric 30 of the different panels 22. Each object 160, 162, 164, 166, 168 can include light-emitting diodes or other light emitting elements incorporated therein for emitting light. Such light emitting elements can be any of those described in U.S. Pat. No. 5,278,734 to Ferber, U.S. Pat. No. 5,567,037 to Ferber, U.S. Pat. No. 5,455,749 to Ferber, U.S. Pat. No. 5,371,657 to Wiscombe, U.S. Pat. No. 5,626,948 to Ferber et al., and U.S. Pat. No. 5,973,420 to Kaiserman et al., whose disclosures are incorporated by this reference as though fully set forth herein.

Figure 18:
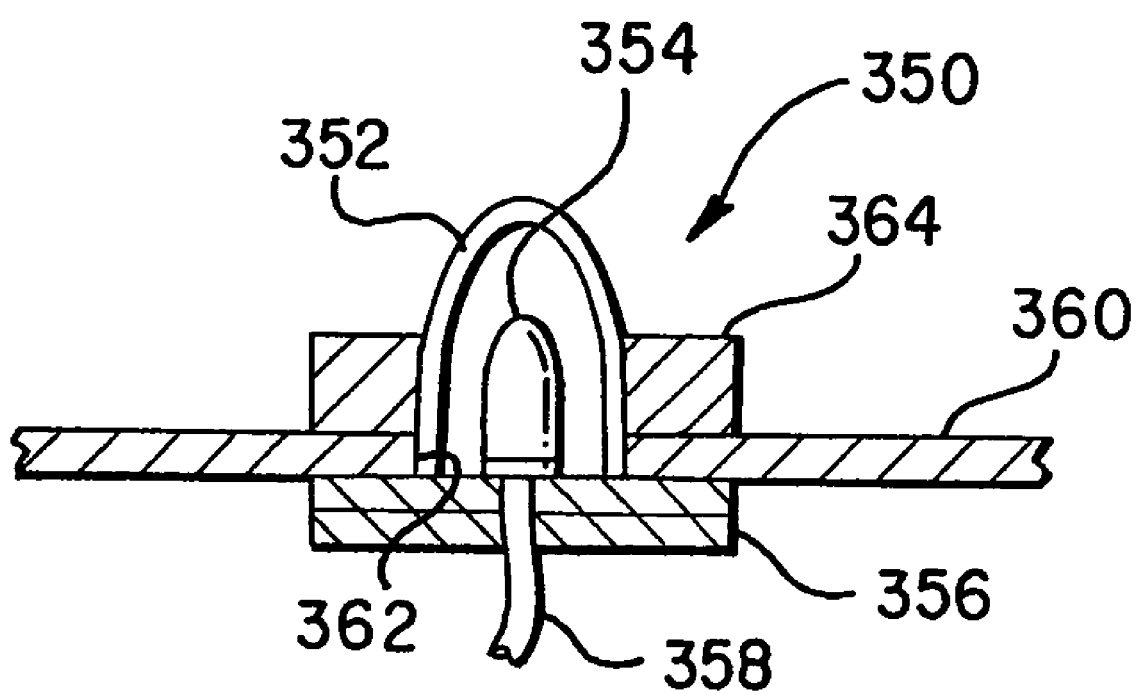
FIG. 18 is a cross-sectional view of a light emitting element that can be incorporated with the fabric of a panel of the structure of FIG. 8.

For example, U.S. Pat. No. 5,278,734 to Ferber discloses one method for securing light emitting elements to circuit boards, one of which is illustrated in FIG. 18. Each light emitting element 350 includes an elongated tubular cover member or head 352 which is closed at one end and opened at the opposite end. A light emitting diode 354, such as those that are widely available in the art, is connected to an associated circuit board 356, which is in turn fastened by any suitable or known mechanism to the open end of the tubular head 352, so that in the assembled position, the diode 354 extends into the tubular head 352. The circuit board 356 is connected to a power source and/or electronic control by a connector 358. Each light emitting element 350 extends through an opening 362 in the fabric 30 of the panel 22, and the fabric 30 is clipped or held between the tubular head 352 and the circuit board 356. The outer surface of the tubular head 352 is threaded, so that a threaded nut 364 can engage the tubular head 352 to secure the tubular head 352 to the fabric 30 and the circuit board 356, which acts as a stop member.

Conductive paths 172 can be attached or otherwise provided on the fabric 30 for connecting each of these graphics 160, 162, 164, 166, 168, the speaker 170 and the processor 173 to a power supply via a power plug 174. These conductive paths 172 can include the conductive lines, stripes, traces, compositions, inks, liquids, pastes, granules and colored inks, and can utilize the electrical systems and attachment techniques, described in U.S. Pat. No. 5,455,749 to Ferber, U.S. Pat. No. 5,371,657 to Wiscombe, U.S. Pat. No. 5,626,948 to Ferber et al., and U.S. Pat. No. 5,973,420 to Kaiserman et al., as well as those that are known in the art. One non-limiting example of a material that can be used as a conductive ink is a material sold under the tradename 102-05F by Creative Materials of Tyngsboro, Mass. Other materials are described in one or more of U.S. Pat. No. 5,455,749 to Ferber, U.S. Pat. No. 5,371,657 to Wiscombe, U.S. Pat. No. 5,626,948 to Ferber et al., and U.S. Pat. No. 5,973,420 to Kaiserman et al.

Thus, FIG. 8 illustrates the use of conductive paths as an alternative to the use of conventional wiring illustrated in FIG. 4. The structure 20 in FIG. 8 can also be configured to be part of another game. For example, the numbered graphics 160, 162, 164 and 166 can be coupled (via the conductive paths and wiring) to the processor 173, which can control a game in which the different numbered graphics 160, 162, 164 and 166 are made to light up at different times, in which a child is to follow the lighted graphics in (a) moving about the inside or outside of the structure 20, (b) recognizing and repeating the lighted number, and (c) adding the lighted number to the previous sum, among others. The speaker 170 can make announcements, emit congratulatory praises, or emit any other desired sounds or music. Other variations and themes for games utilizing numbered graphics are also possible (e.g., some of the concepts and game ideas described in connection with FIG. 4 can even be incorporated), and can vary based on the educational or other objective(s) that are intended to be accomplished.

Figure 9A:
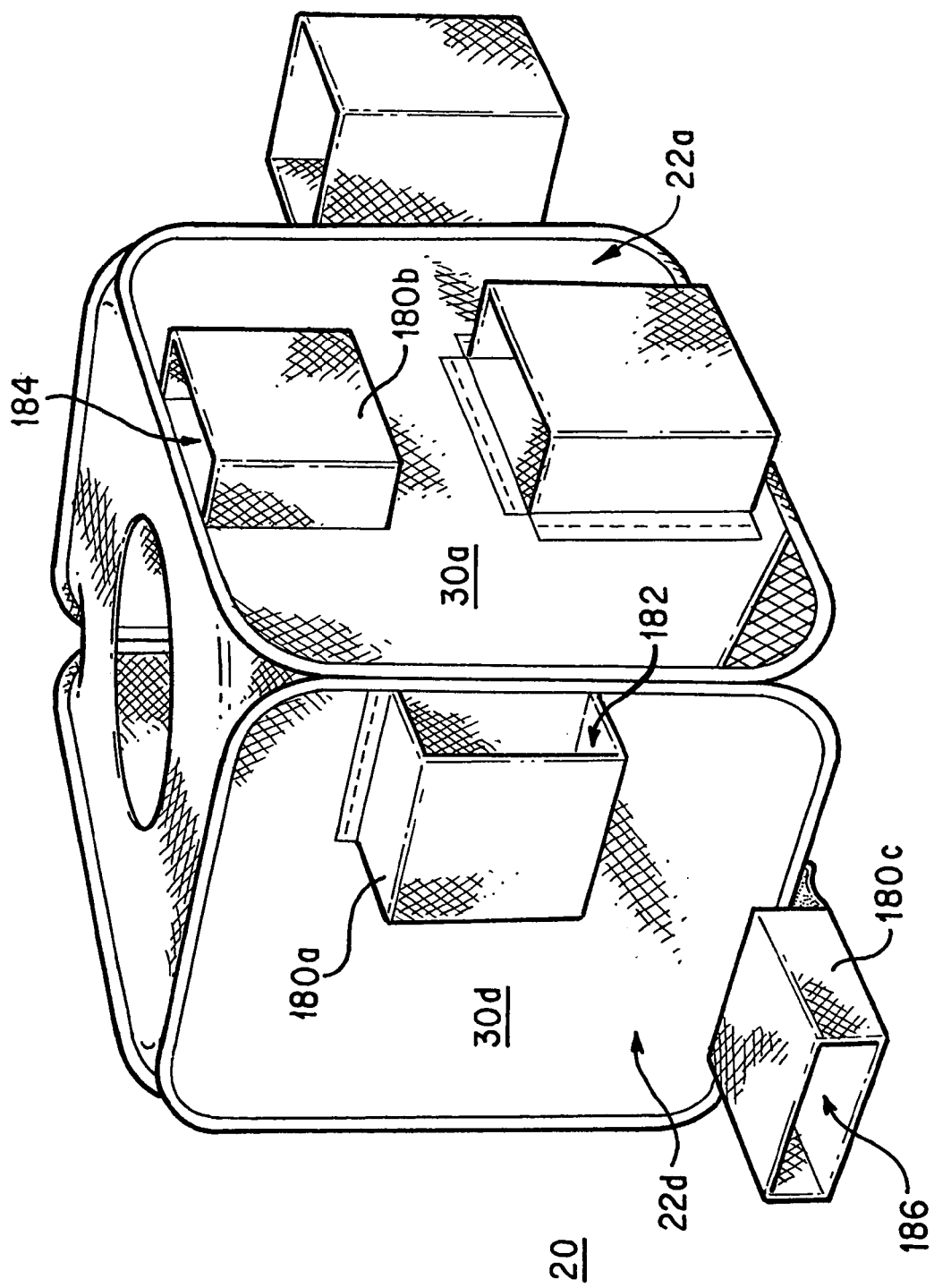

FIG. 9A illustrates another embodiment of the present invention, in which the structure 20 is provided with yet a different type of enhancement or feature. In FIG. 9A, the structure 20 has a plurality of pockets or spaces 180 that are attached to the fabric 30 of the side panels 22. Each of these pockets or spaces 180 can be made of the same material as the fabric 30, and can be provided in different shapes and sizes to hold or store different objects, which can include electronic devices, three-dimensional toys or objects, or any of the other items and objects described above. Each pocket

180 can be either permanently attached (e.g., via stitching), or removably attached (e.g., by Velcro™ pads), to the fabric 30. Each pocket 180 can be oriented in a variety of different ways. For example, one pocket 180*a* can be oriented with two side openings 182 adjacent and parallel to the fabric 30*d*, another pocket 180*b* can be oriented with one top opening 184, and yet another pocket 180*c* can be oriented with an outer side opening 186 that extends away perpendicularly from the panel 22*d*.

Figure 9B:
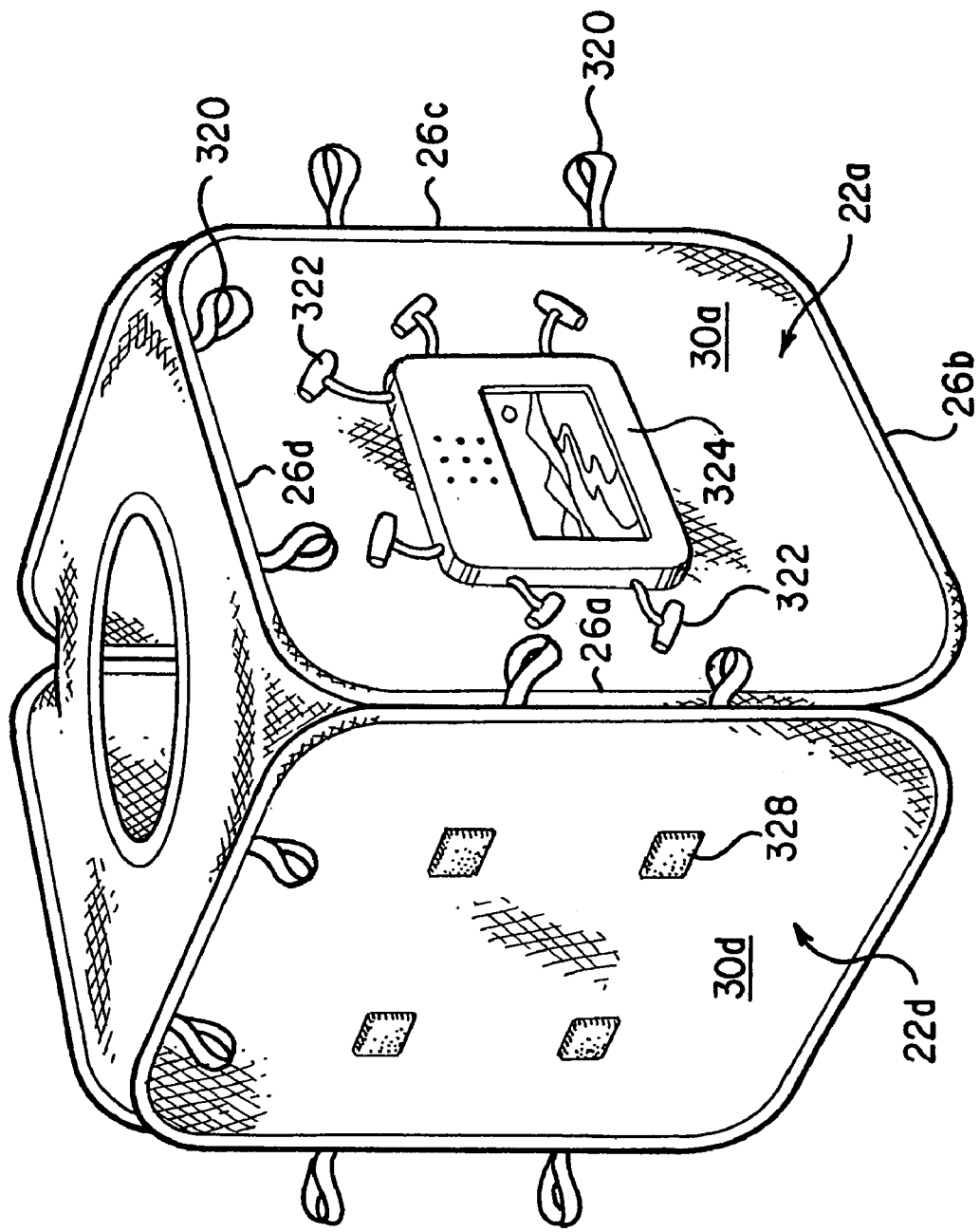

FIG. 9B illustrates alternative ways for coupling or attaching the separate objects to the panels 22*a*-22*d*. For example, loops 320 can be provided either on the fabric 30*a*, 30*d* or the sides 26 of the panels 22*a* and 22*d*. The loops 320 are adapted to receive toggles 322 provided on a computer or screen 324. Thus, the computer or screen 324 can be suspended from the panel 22*a* via the coupling of the toggles 322 in corresponding loops 320. Other objects can also be suspended or hung to the panels 22*a*-22*d* by utilizing the loops 320. In addition, Velcro™ pads 328 can be attached to the fabric 30*d* of panel 22*d*, and used to couple Velcro™ pads attached to other objects.

Figure 10:
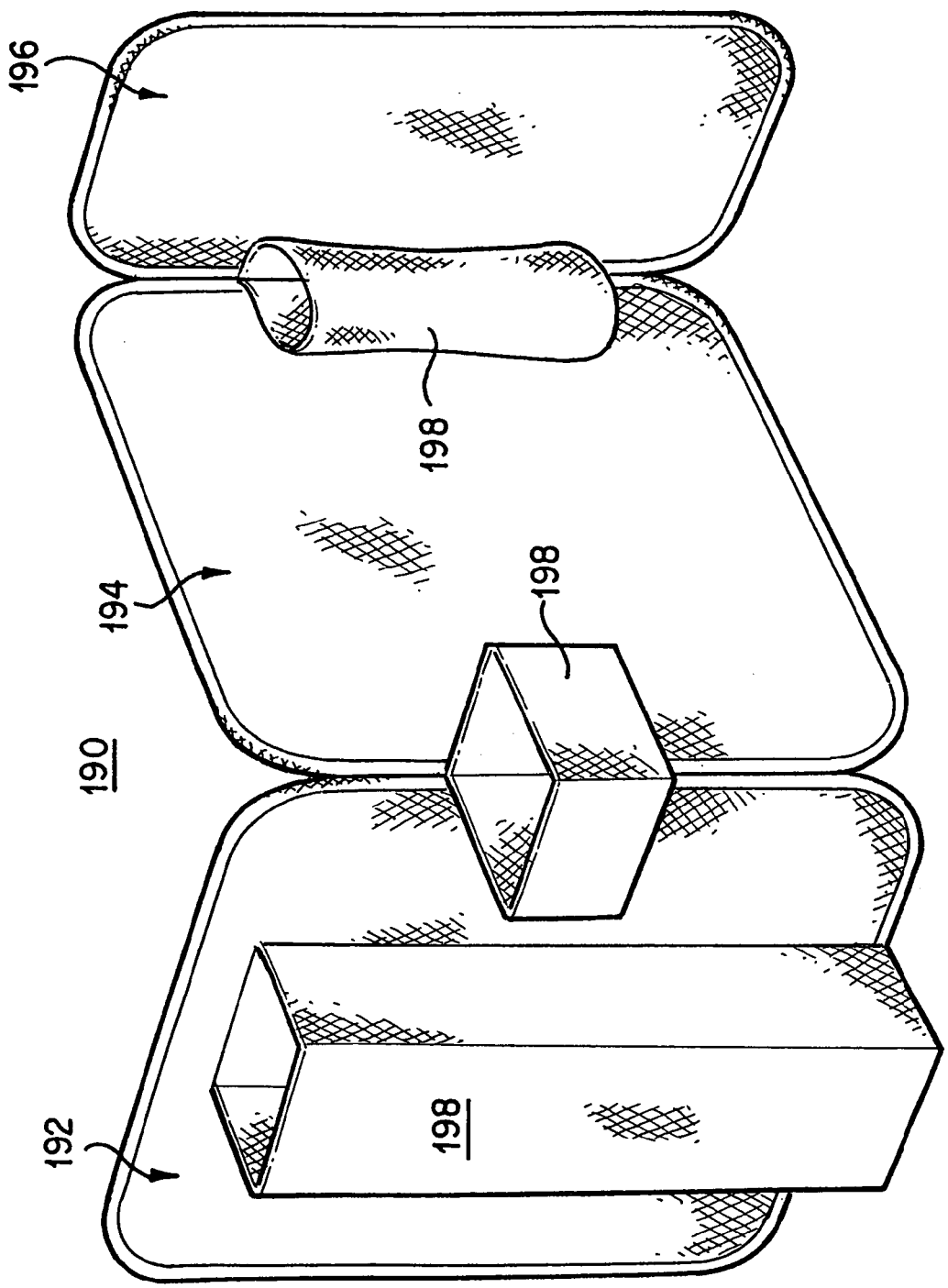

FIG. 10 extends the principles of FIG. 9A to different structures. For example, the structure 190 in FIG. 10 has three panels 192, 194, 196, each of which can have the same construction as any of the panels 22. The three panels 192, 194, 196 are not connected to form an enclosed space, and can be used as a partition. Pockets 198 having different shapes and sizes can be attached to the fabric or edges of one or more of these panels 192, 194, 196.

Figure 11:
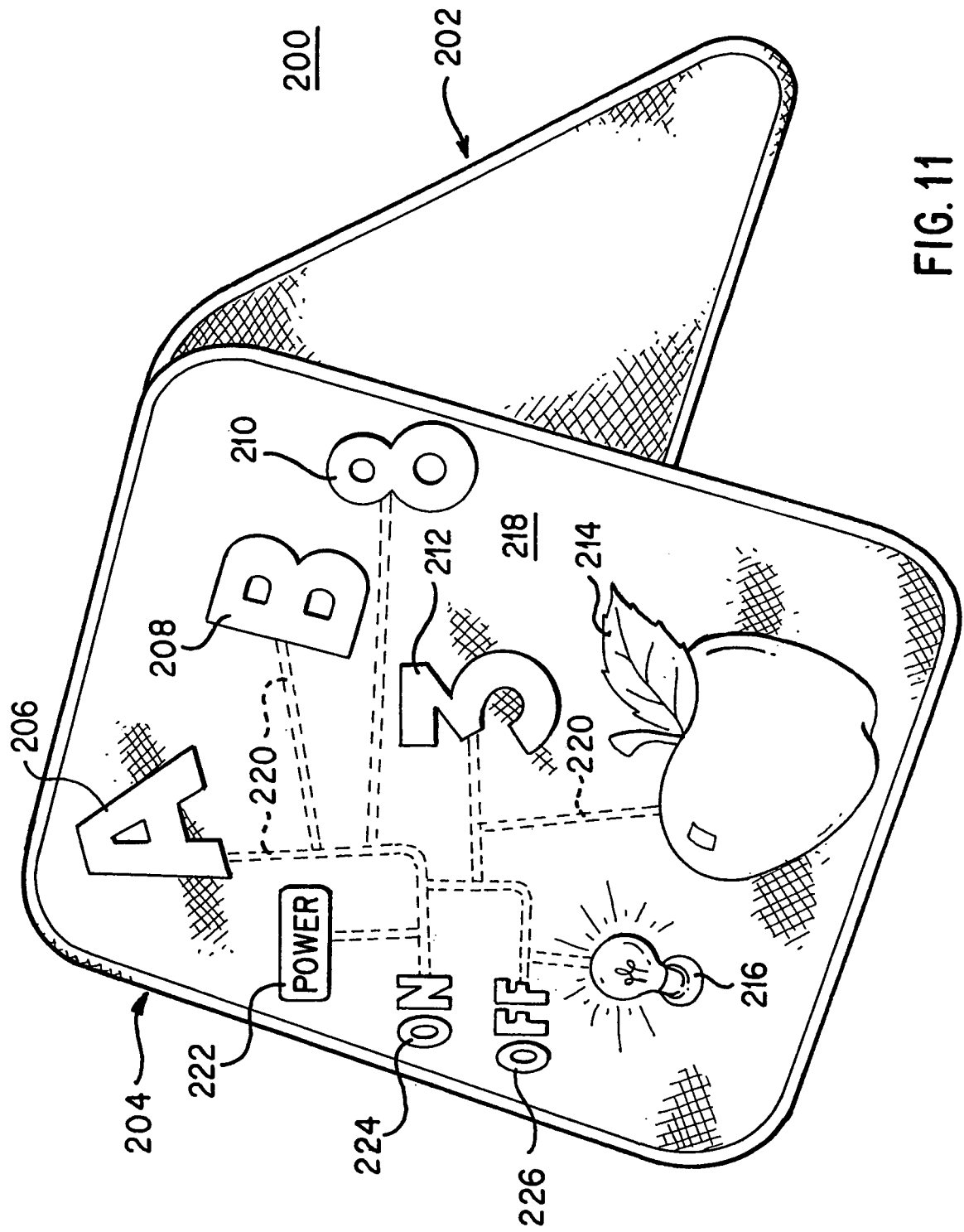

FIG. 11 extends the principles of FIG. 8 to different structures. For example, the structure 200 in FIG. 10 has two panels 202 and 204, each of which can have the same construction as any of the panels 22. The two panels 202, 204 are not connected to form an enclosed space, but are supported in an inverted-V shape. A plurality of graphics or other objects are provided on the fabric of the respective panels 202, 204, with these graphics and objects capable of emitting light or sound. For example, a plurality of graphics or objects 206, 208, 210, 212, 214 and 216 can be attached to the fabric 218 of the panel 202. Conductive paths 220 can be attached or otherwise provided on the fabric 218 for connecting each of these graphics or objects to a power source 222 (e.g., a battery pack). In addition, switches 224 and 226 can also be coupled to the conductive paths 220 for controlling the operation of these objects 206, 208, 210, 212, 214 and 216.

Figure 12:
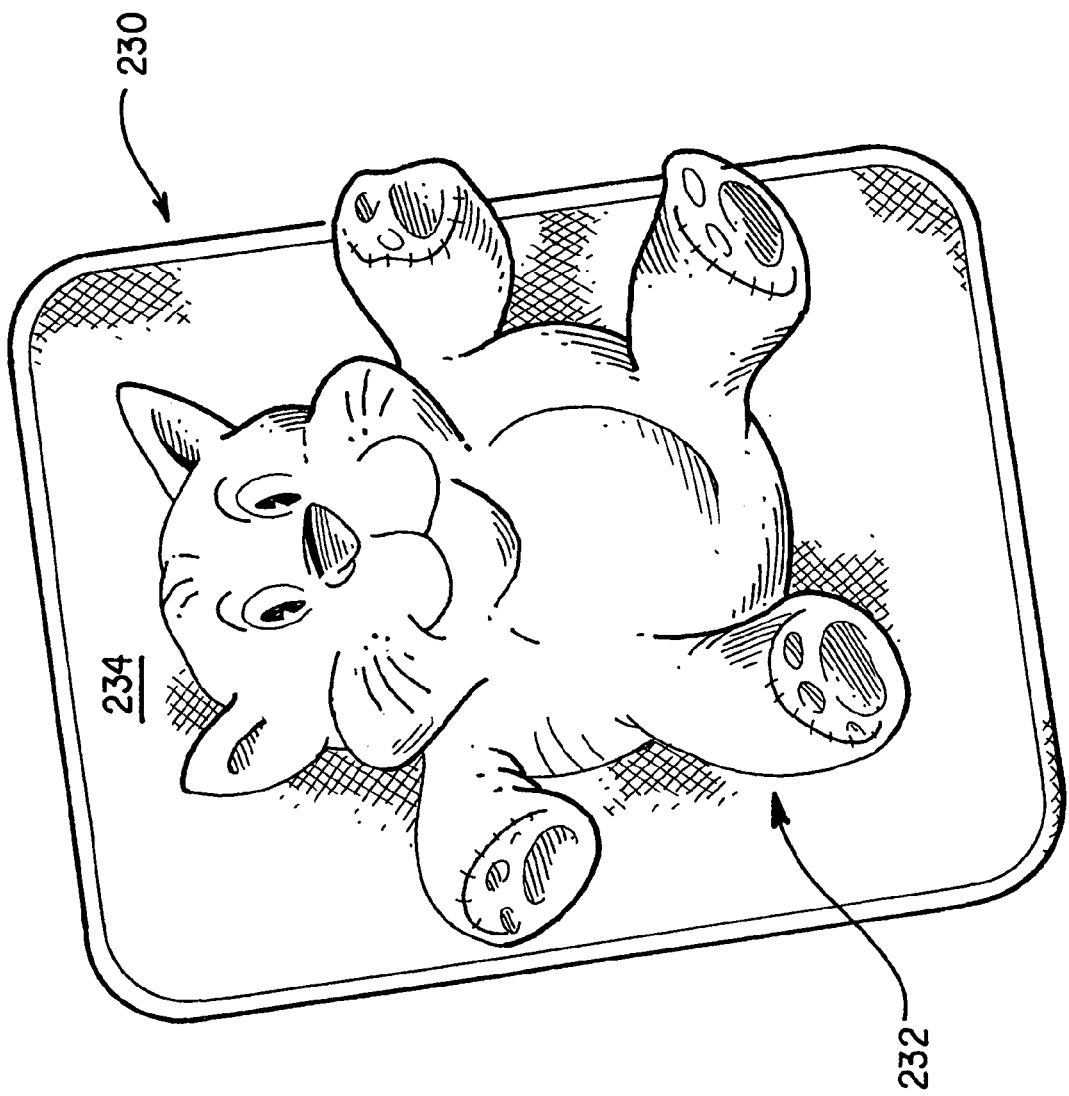
Figure 13:
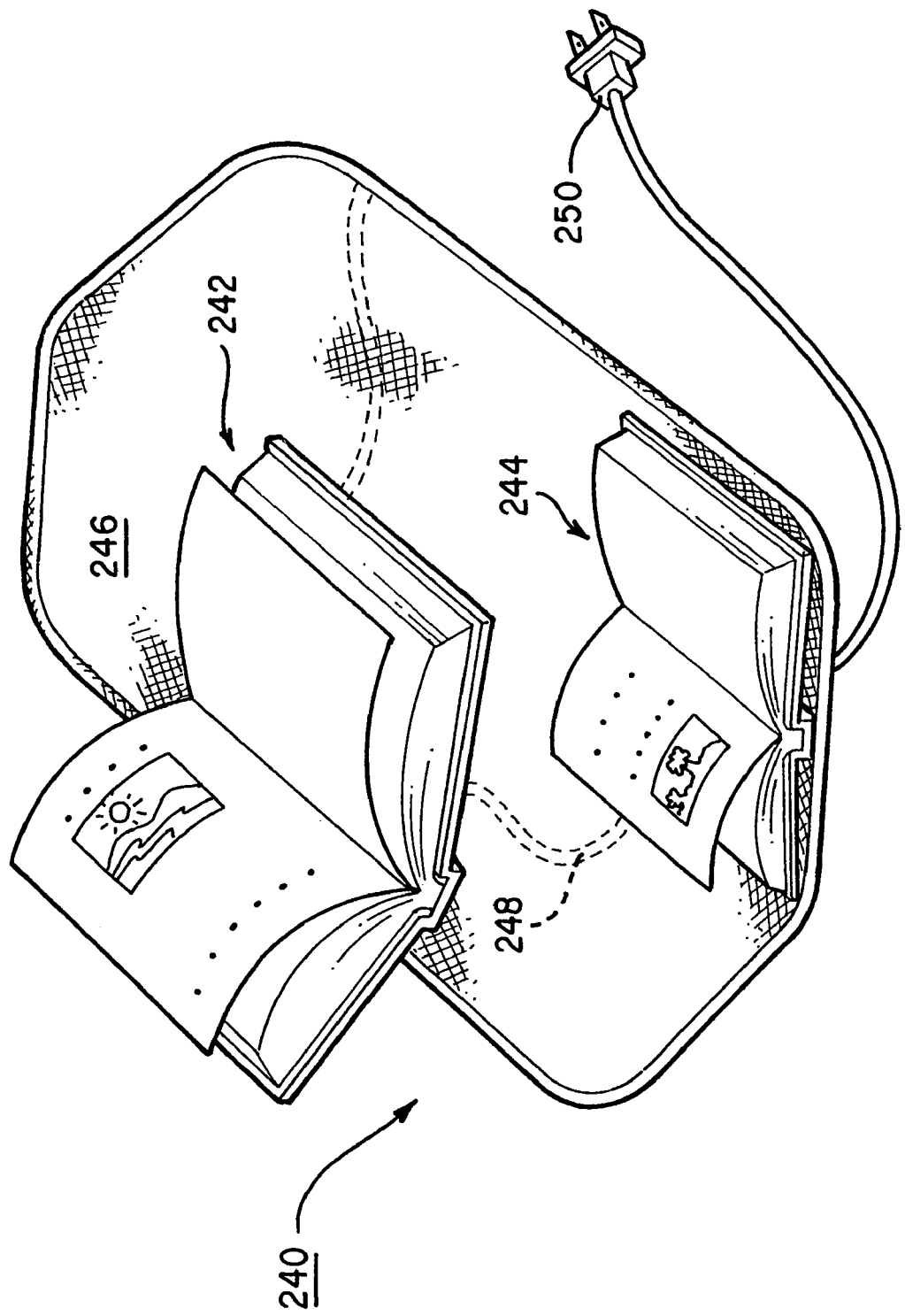

FIGS. 12-16 illustrate the principles of the present invention in connection with a single panel. The single panel can have the same construction as any of the panels 22 described above. For example, FIG. 12 illustrates a single panel 230 having a three-dimensional object 232 (such as a stuffed toy) stitched or otherwise attached to the fabric 234 of the panel 230. FIG. 13 illustrates a single panel 240 having two electronic books 242, 244 attached (e.g., stitching, Velcro™, glue, loops, screws, and the like) to the fabric 246 of the panel 240, and having conductive paths 248 provided on the fabric 246 and connecting the books 242, 244 to a power plug 250.

Figure 14:
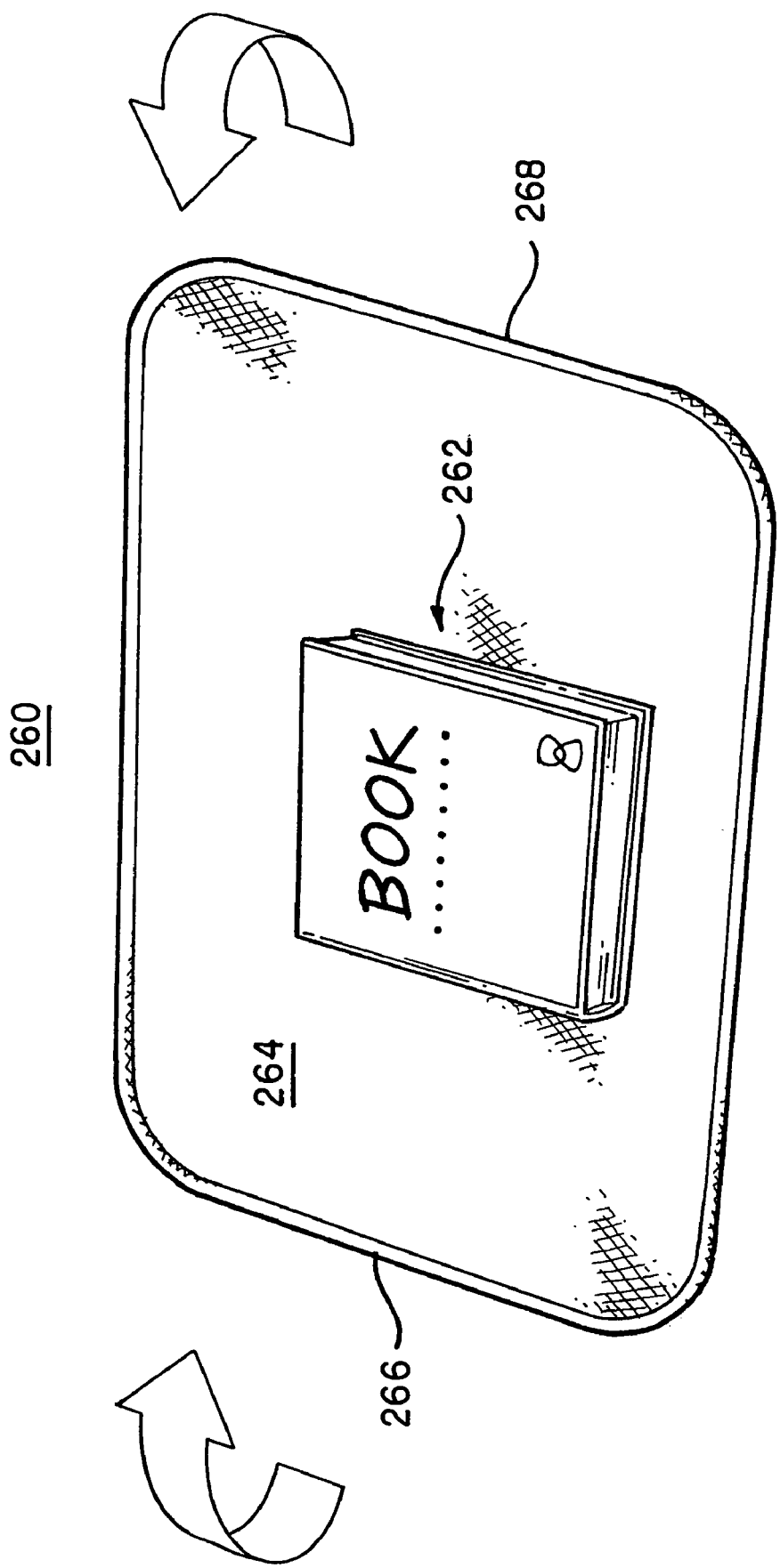
Figure 15:
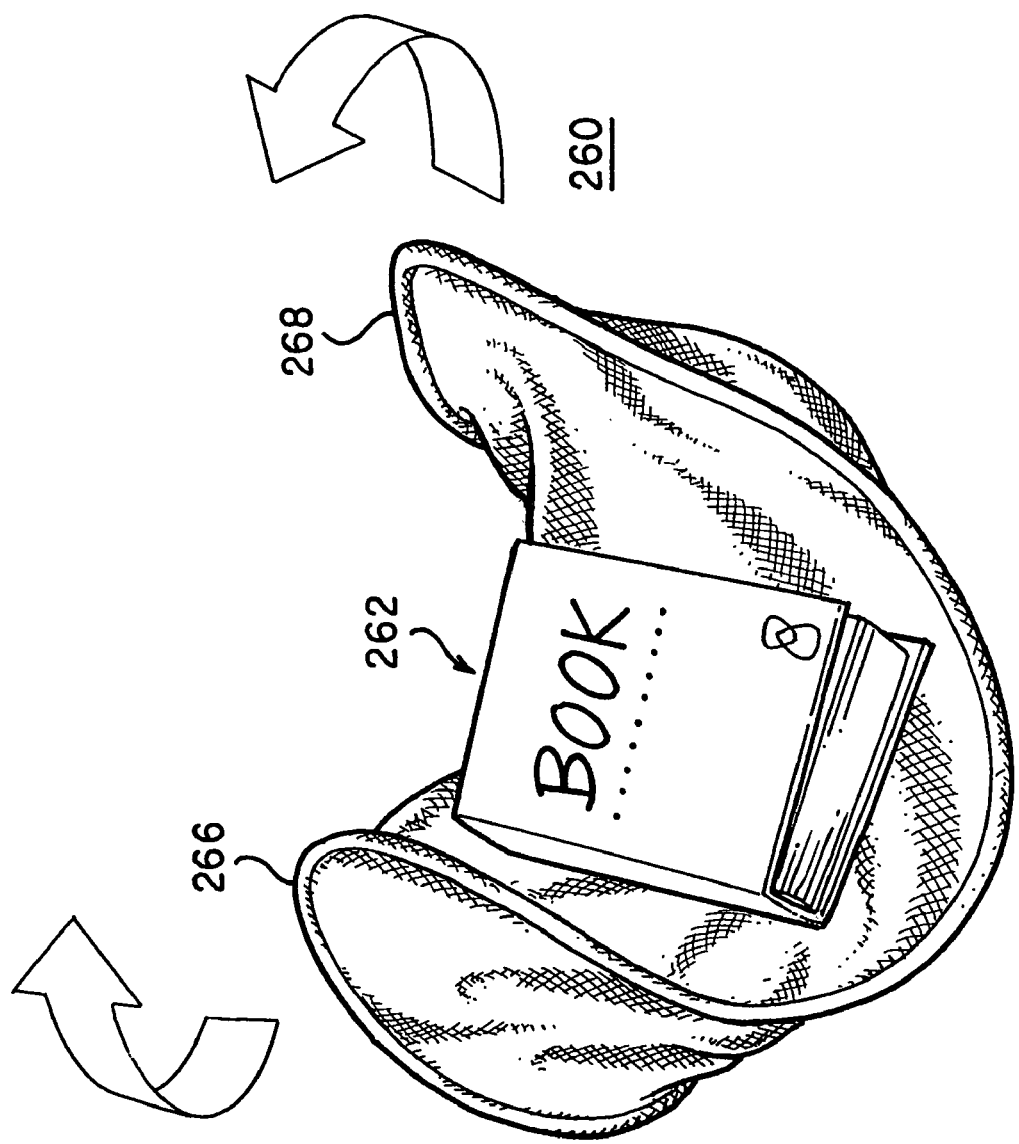
FIGS. 15 and 16 illustrate how the structure of FIG. 14 may be twisted and folded for compact storage.
Figure 16:
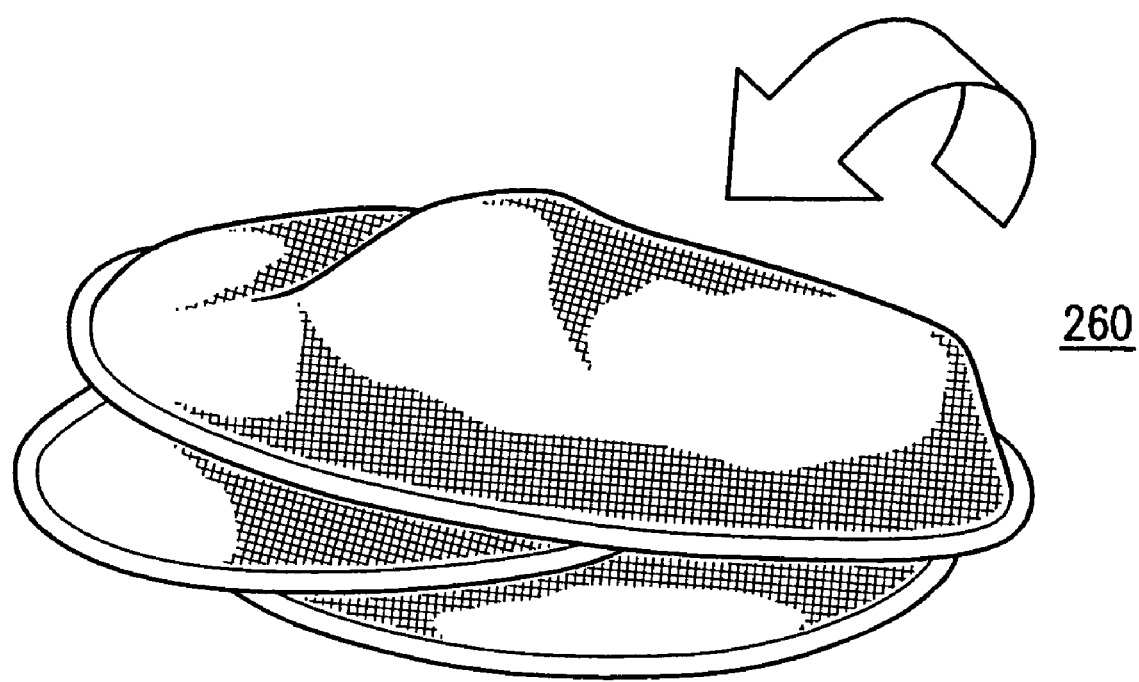

As a further example, FIG. 14 illustrates a single panel 260 having a three-dimensional object 262 (such as a book) stitched or otherwise attached to the fabric 264 of the panel 260. FIGS. 15 and 16 illustrate how such a three-dimensional object can be folded during the twisting and folding of the panel 260. As shown in FIG. 15, the panel 260 is folded in the same manner as any other panel, by twisting opposing sides 266, 268 of the panel 260 with the object 262 still carried by the fabric 264. During the subsequent folds that result from the twisting actions, the object 262 is nestled between adjacent layers of the folded fabric 264, as shown in FIG. 16. Therefore, as long as the object 262 is not sized to be too large, it can be accomodated inside the adjacent layers of the fabric 264 as the panel 260 is being twisted and folded to a smaller configuration. The steps illustrated in FIGS. 15 and 16 can apply to FIGS. 12 and 13 as well.

Figure 17:
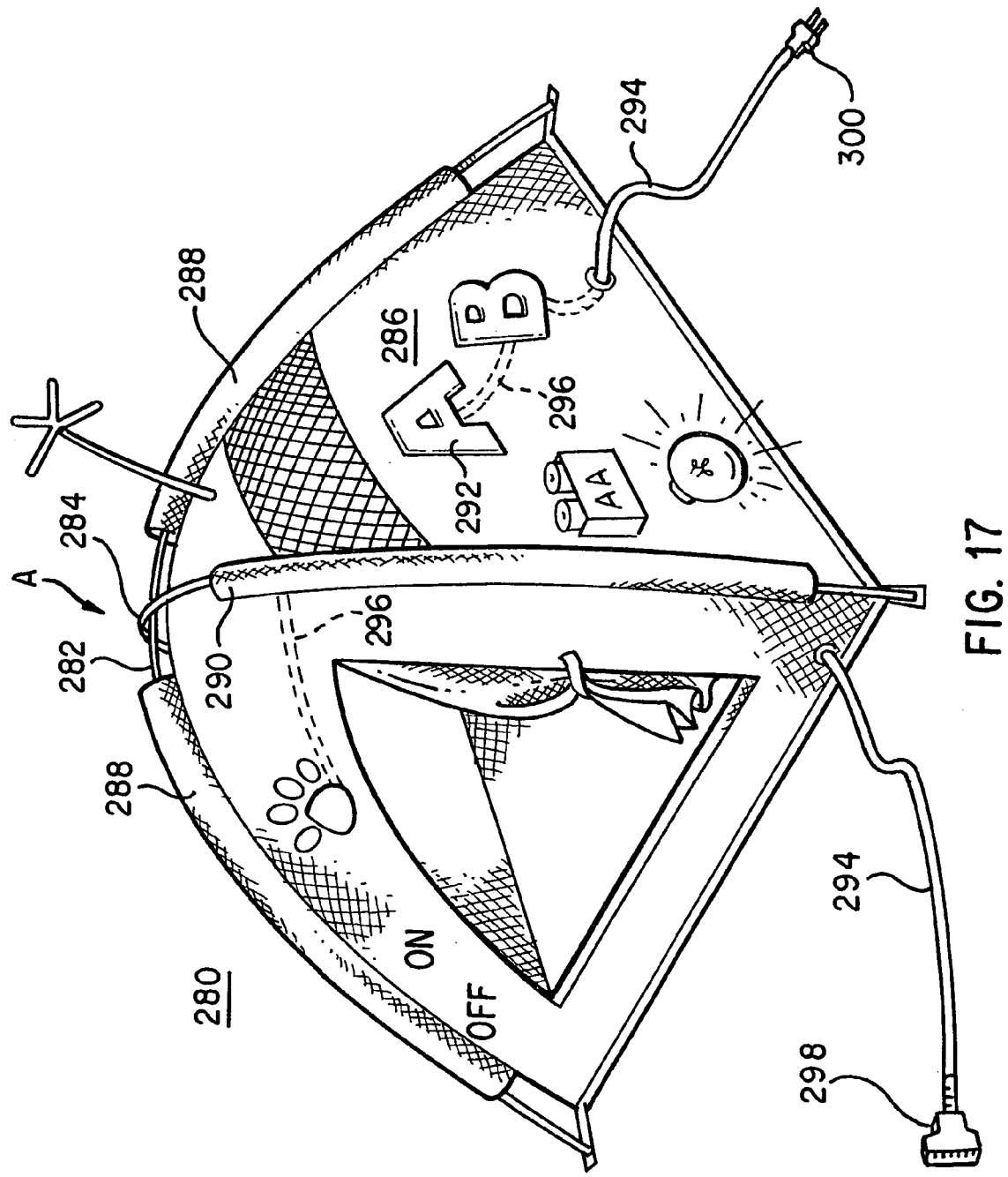
FIG. 17 is a perspective view of a collapsible structure according to yet another embodiment of the present invention.

FIG. 17 extends the principles of FIG. 4 to different structures. In FIG. 17, the structure 280 does not have separate panels 22, but is instead made up of two crossing frame members 282, 284 that can be the same as the frame member 28 described above. The frame members 282, 284 cross at an apex A, and their respective ends are secured to the ground or surface, so as to form a domed or apexed configuration for the structure 280. Fabric material 286 is stitched or otherwise attached to the frame members 282, 284 to form an enclosing tent or structure. Frame retaining sleeves 288 and 290 can be stitched to the fabric 286 to retain the frame members 282 and 284, respectively. A number of graphics and objects (passive and electrical), such as 292, can be attached to the fabric 286, and coupled by wiring (e.g., 294) or conductive paths (e.g., 296) to each other and to other types of connectors, such as personal computer connectors 298 and power plugs 300.

Figure 19A:
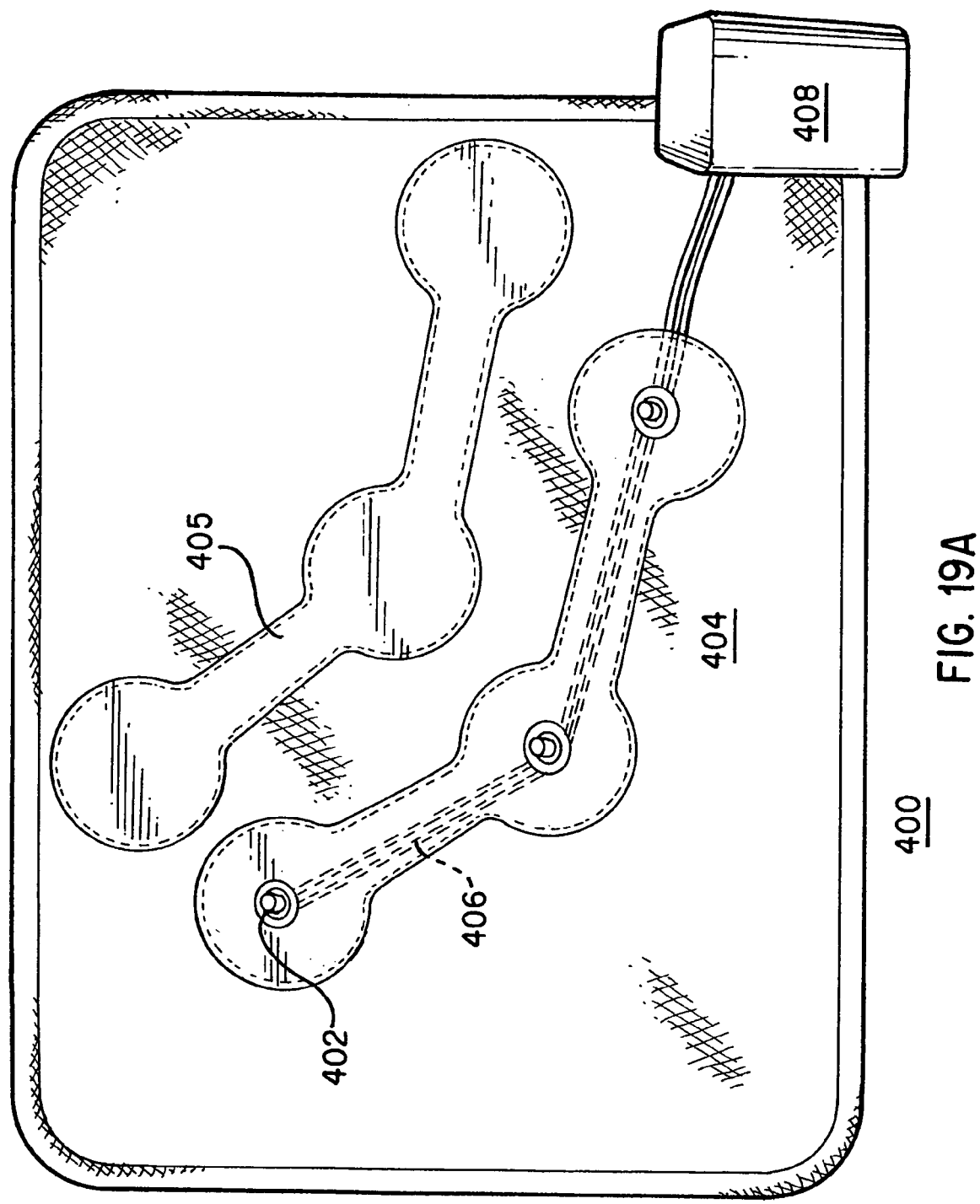
FIG. 19A is a perspective view of a collapsible structure according to yet another embodiment of the present invention.

The embodiments in FIGS. 19A and 20 illustrate a combination of the principles of the embodiments from FIGS. 8, 11 and 13. For example, the panel 400 in FIG. 19A can be provided with touch sensors or objects 402 that are attached to the fabric 404 of the panel 400. Conductive wiring or paths 406 can be attached or otherwise provided on the fabric 404 for connecting each of these touch sensors or objects 402 to a power source 408 (e.g., a battery pack). A fabric covering 405 can be stitched to the fabric 404 to cover the touch sensors or objects 402 and the conductive wiring or paths 406. The panel 400 can have any number of sides or assume any shape or size.

Figure 19B:
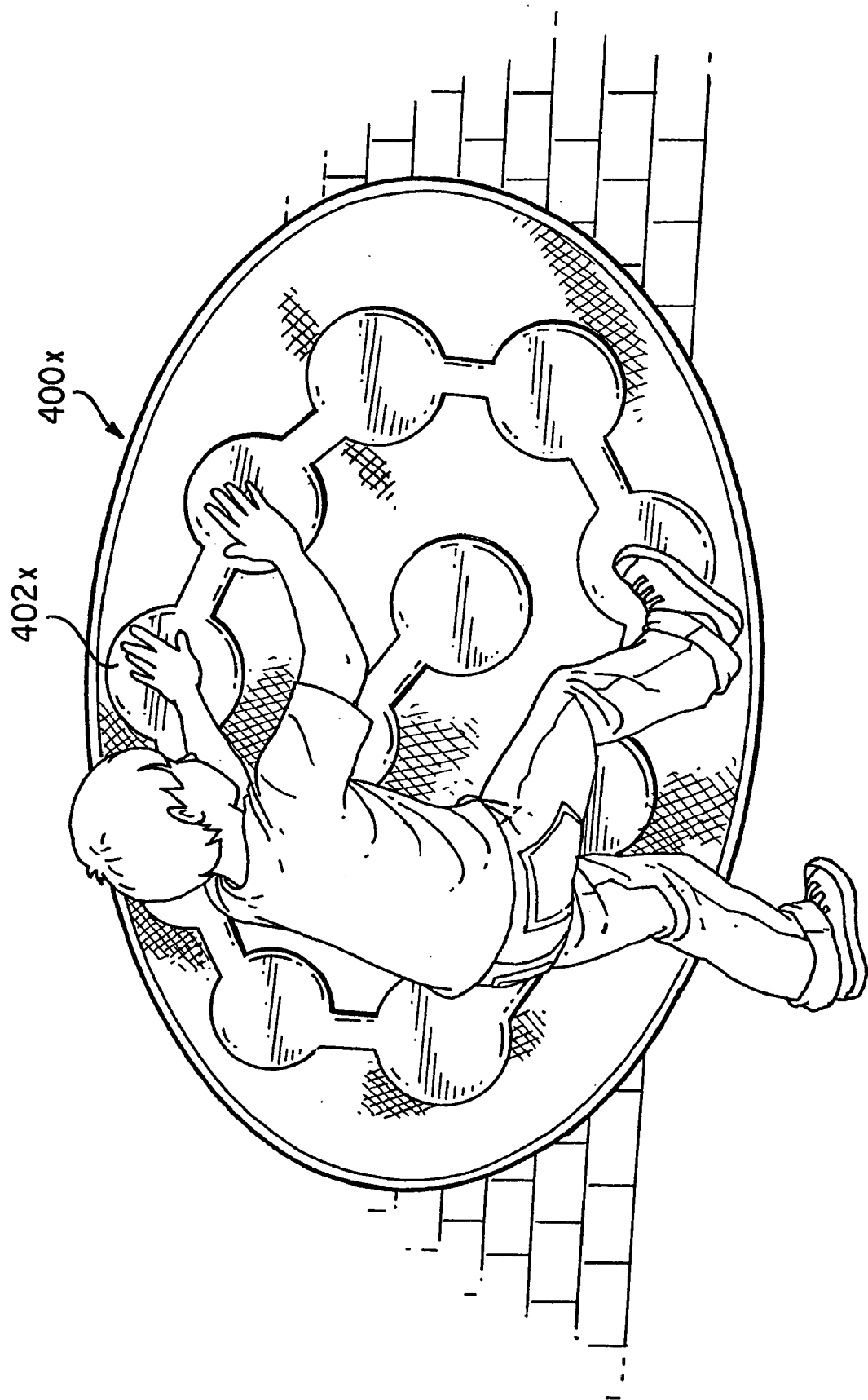
FIG. 19B illustrates a collapsible structure similar to that in FIG. 19A in use.

The structure 420 in FIG. 20 illustrates a plurality (e.g., three) of the panels 400 hingedly coupled together (such as according to one of the techniques of FIGS. 2A-2B) to form an L-shaped structure. The conductive paths (such as 406*a*) can extend from one panel 400 across the hinged connections to another panel 400. Each panel 400, or the combined structure 420, can form (a) a mat with the touch sensors 402 and conductive paths defining a desired walking path, or (b) a game board with the touch sensors 402 defining touch pads for a touch game, among numerous possible uses. For example, FIG. 19B illustrates a panel 400*x* that is the same as the panel 400 (except for a different shape and different positions for the touch sensors 402*x*), in use by a child. As shown in FIG. 19B, the panel 400*x* can be supported against a wall and the child can use his or her hand to press selected touch sensors 402*x*. Alternatively, the panel 400*x* can be placed flat on the ground and the child can use his or her feet to step on selected touch sensors 402*x*.

Figure 21A:
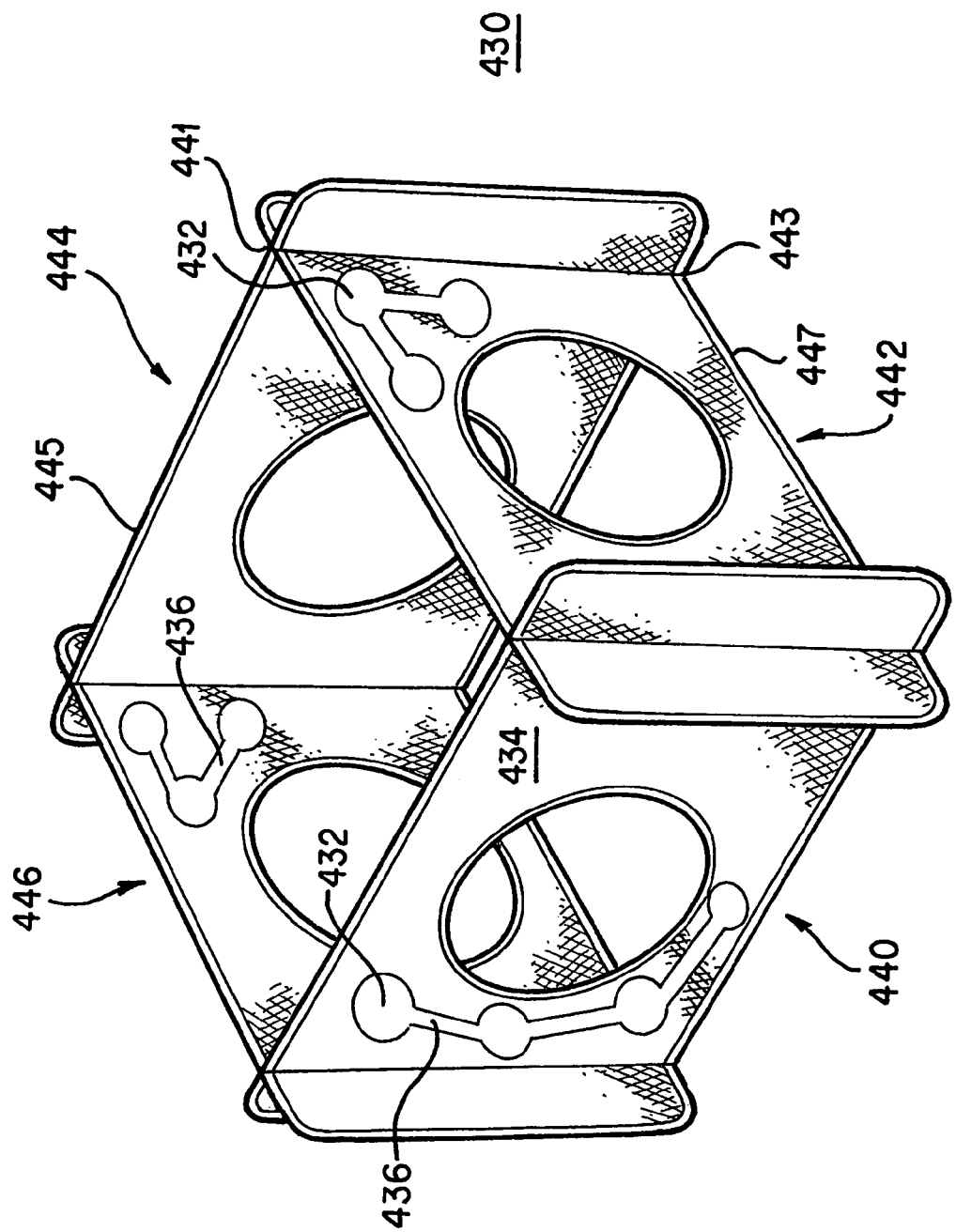
Figure 21B:
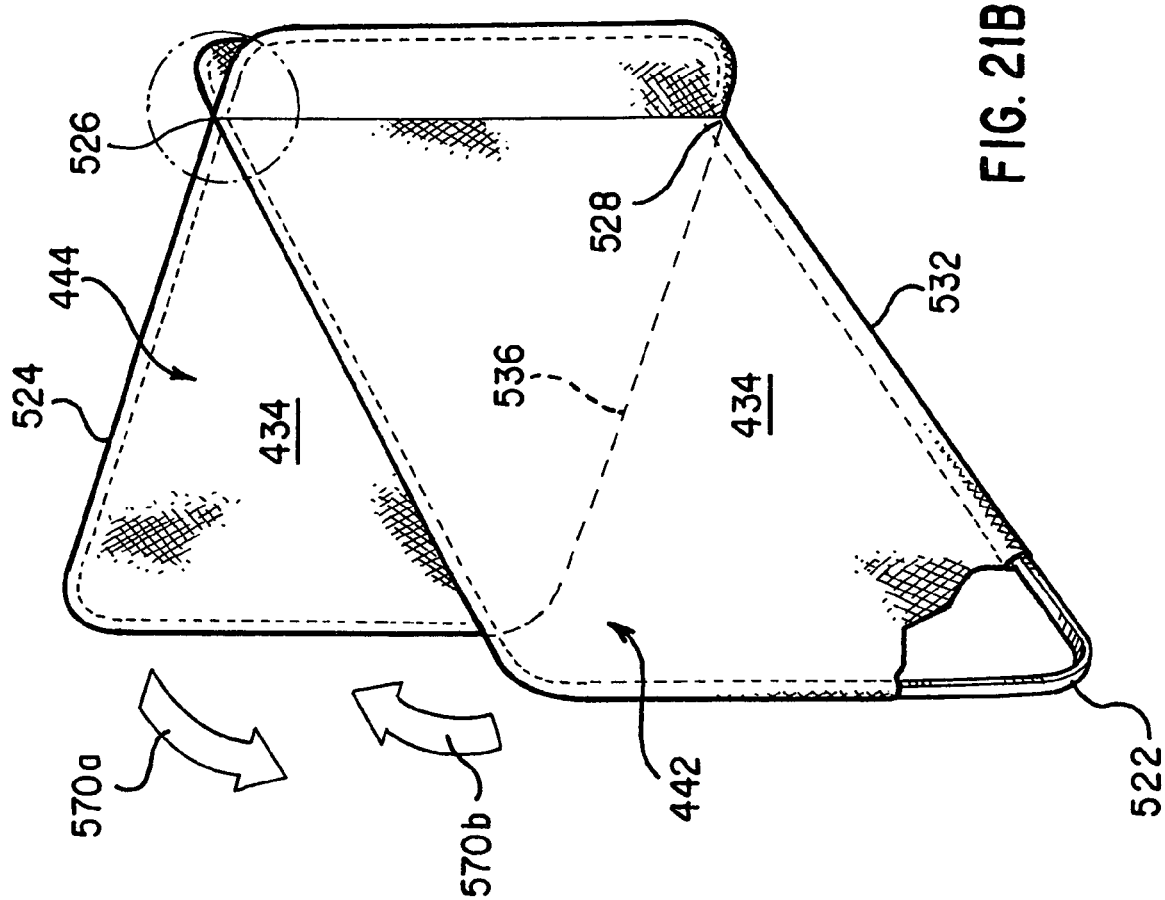
FIGS. 21B and 21C illustrate the construction of the overlapping panels in FIG. 21A.
Figure 21C:
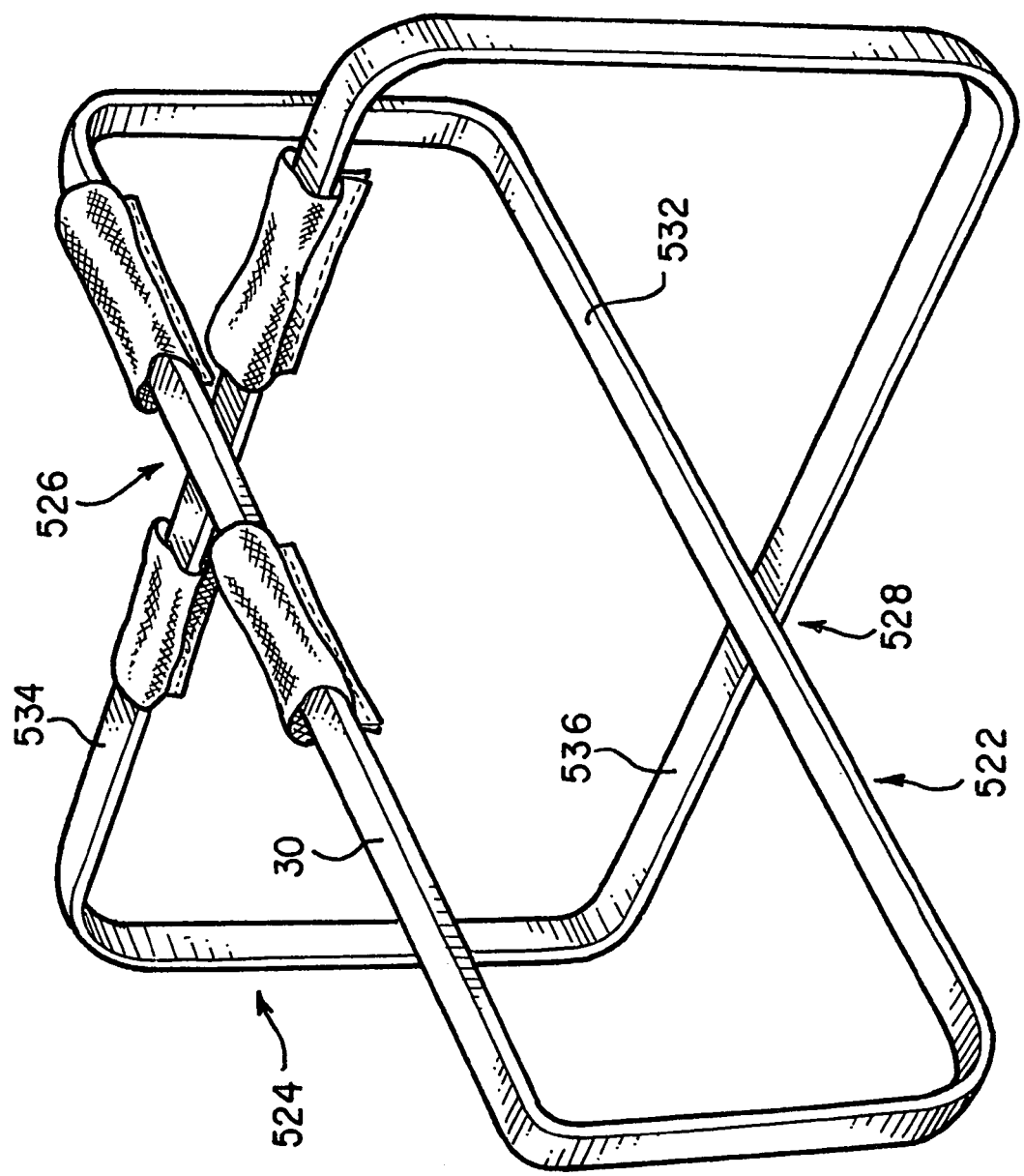

The principles of the present invention can be further extended to other structures that are already known in the art. For example, FIG. 21A illustrates a structure 430 that is almost identical to the structure 140 shown and described in FIG. 8 of U.S. Pat. No. 6,032,685 to Zheng, whose entire disclosure is hereby incorporated by this reference as though fully set forth herein. The difference between structure 430 in FIG. 21A and the structure 140 in FIG. 8 of U.S. Pat. No. 6,032,685 is that touch sensors or objects 432 are attached to the outer and/or inner surfaces of the fabric 434 of the panels 440, 442, 444, 446. Conductive wiring or paths 436 can be attached or otherwise provided on the fabric 434 for connecting each of these touch sensors or objects 432. The structure 430 differs from that of structure 20 of FIG. 1 in that each individual panel 440, 442, 444, 446 is hingedly coupled to an adjacent panel in a different way. In structure 430, the hinged coupling is accomplished by crossing or overlapping the sides of adjacent panels, which is illustrated in FIGS. 21B and 21C. FIGS. 21B and 21C correspond to FIGS. 1A and 3, respectively, of U.S. Pat. No. 6,032,685, and illustrate the hinged coupling of the panels 442 and 444.

In particular, each pair of adjacent panels 442 and 444 is defined by a separate resilient frame members 522 and 524, respectively, that together define the outer boundary of the overlapping panels 442 and 444. Each frame member 522 and 524 can be the same as the frame member 28c in FIGS. 1 and 1A, and are fitted within each other, and overlap or cross-over each other at overlapping points 526 and 528. The overlapping point 526 is defined by the intersection or crossing of the upper edges 530 and 534 of frame members 522 and 524, respectively, and the overlapping point 528 is defined by the intersection or crossing of the lower edges 532 and 536 of frame members 522 and 524, respectively. The overlapping points 526 and 528 can be positioned anywhere along the upper edge 530 or lower edge 532 of the frame member 522, and anywhere along the upper edge 534 or lower edge 536 of the frame member 524. The two overlapping frame members 522 and 524 are pivotable about their overlapping points 526 and 528 between two positions, a first completely open position in which both frame members 522 and 524 lie flat in about the same plane, and a second folded position in which the frame members 522 and 524 are folded towards each other (such as in the direction of arrows 570a and 570b in FIG. 21B) to overlie each other. Each frame member 522 and 524 is retained in a loop retaining portion of one or more fabric pieces. For example, as shown in FIG. 21B, two fabric pieces 434, one for each frame member 522 and 524. Each fabric piece 434 covers (either partially or completely) and forms a panel 442 or 444 within the respective frame member 522 or 524, and is preferably held in tension with the frame member 522 or 524. The other details relating to adjacent overlapping panels are set forth in greater detail in the specification and drawings of U.S. Pat. No. 6,032,685, and shall not be repeated herein.

Figure 22:
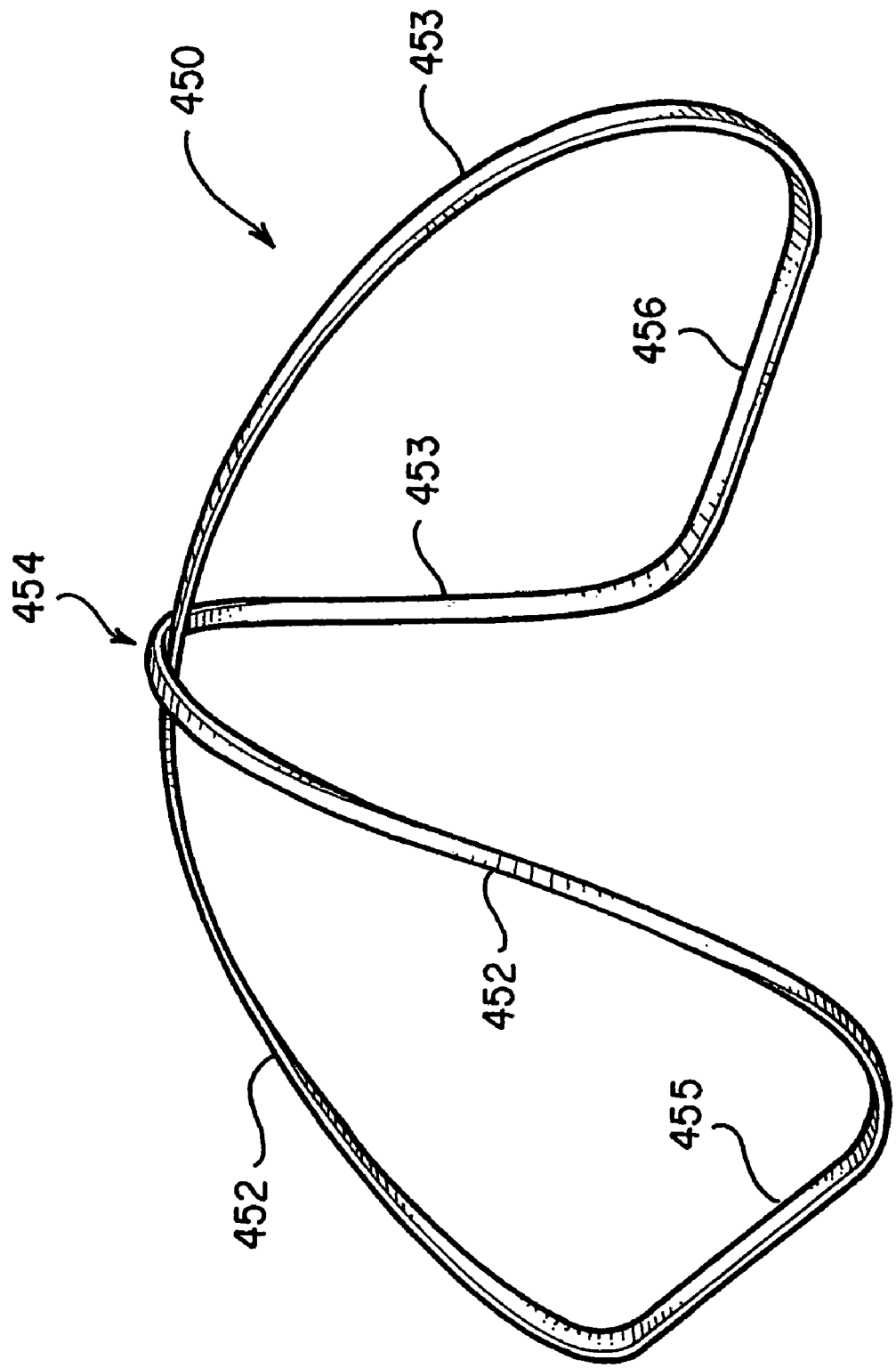
FIG. 22 is a perspective view of the frame member for a conventional figure-eight collapsible structure.
Figure 23:
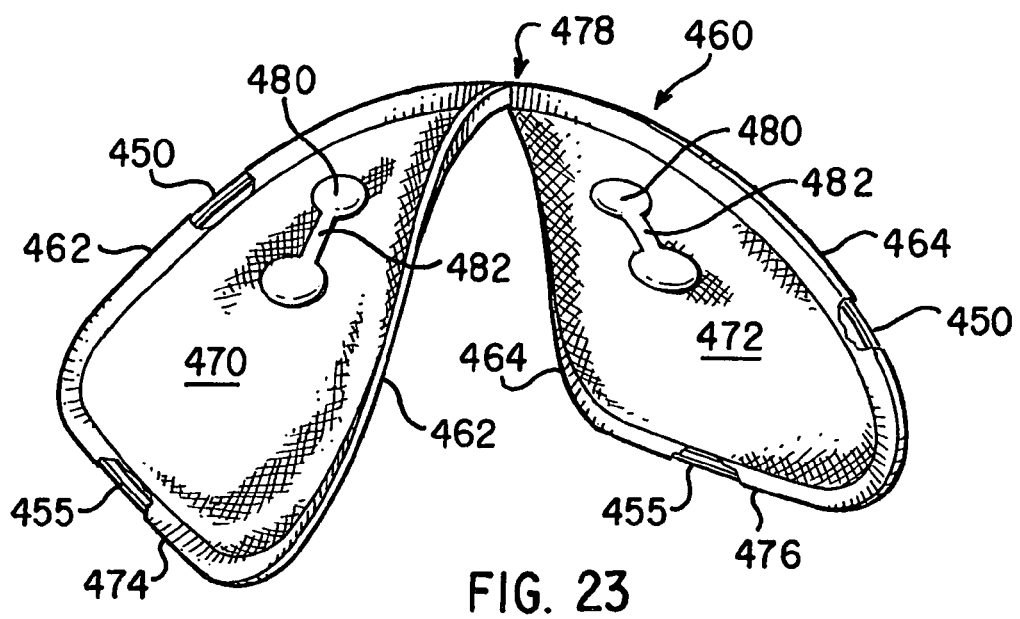
FIG. 23 is a perspective view of a figure-eight collapsible structure according to the present invention incorporating the frame member of FIG. 22.

FIG. 23 illustrates a collapsible structure 460 that is made up of a single figure-eight frame member 450 shown in FIG. 22. FIGS. 22 and 23 correspond to FIGS. 1 and 2, respectively, of U.S. Pat. No. 4,825,892 to Norman, whose entire disclosure is hereby incorporated by this reference as though fully set forth herein. The figure-eight configuration of the frame member 450 is characterized by a left loop 452 separated from a right loop 453 by a crossover point 454. Each loop 452 and 453 has a straight portion 455 for resting on a flat surface when the structure 460 is in the configuration shown in FIGS. 22 and 23. The frame member 450 can be formed from any of the materials used for the frame members 28 above. The figure-eight configuration shown in FIGS. 22 and 23 can be formed by a single 360 degree twist of the frame member 450.

Figure 24:
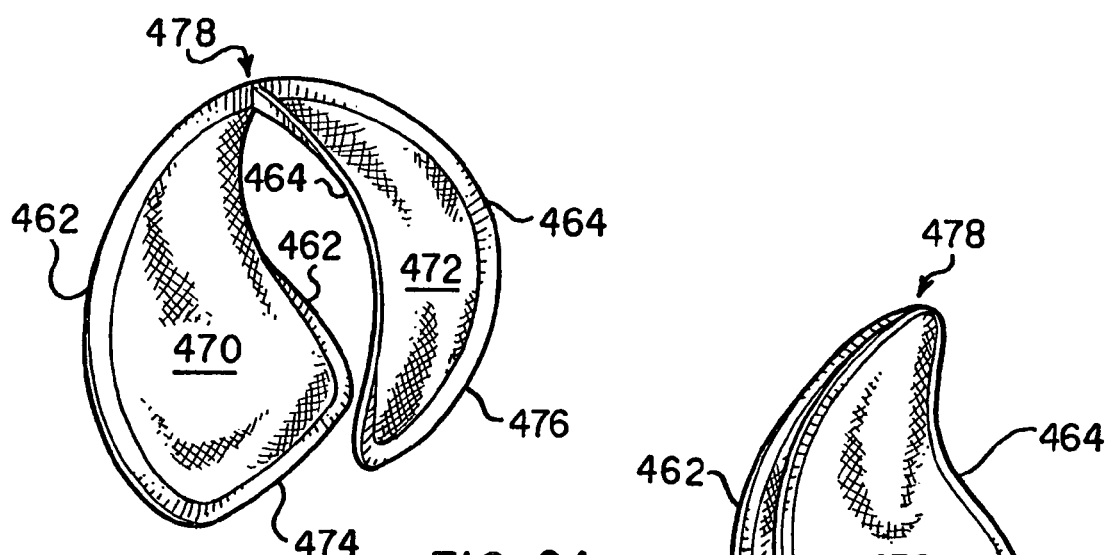
FIGS. 24-26 illustrate how the collapsible structure of FIG. 23 may be twisted and folded for compact storage.
Figure 25:
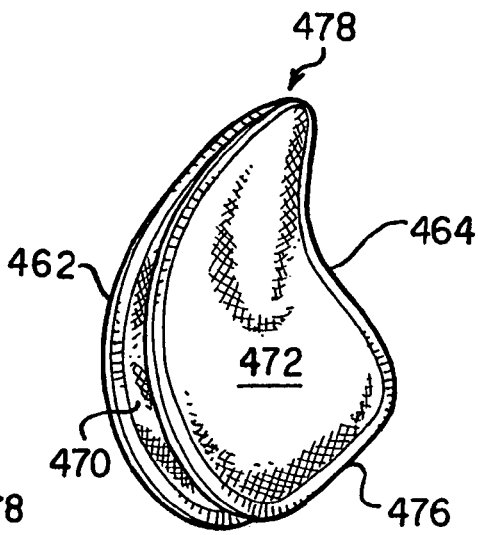
Figure 26:
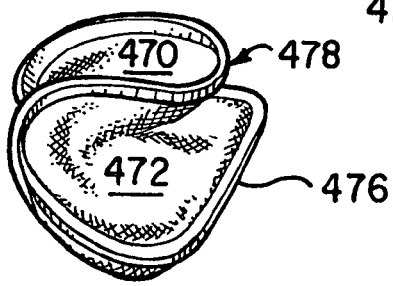

The structure 460 has left and right frame retaining sleeves 462 and 464, respectively, which retain the frame member 450. The sleeves 462 and 464 also define straight portions 474 and 476, respectively, to retain the respective straight portions 455. Fabric 470 and 472 can be stitched or otherwise attached to the sleeves 462 and 464, respectively. Referring to FIG. 24, the structure 460 can be folded and collapsed by pushing or deforming straight portions 474, 476 towards each other. In FIG. 25, the two large loops 452 and 453 are deformed so that they overlie each other and crossover 478 is partly bent towards straight portion 476. In FIG. 26, crossover 478 is further bent towards straight portion 476, and then the steps in FIGS. 3D and 3E can be applied to complete the twisting and folding. FIGS. 24-26 correspond to FIGS. 5-7 of U.S. Pat. No. 4,825,892.

In the structure 460 in FIG. 23, touch sensors or objects 480 are attached to the outer and/or inner surfaces of the fabric 470, 472. Conductive wiring or paths 482 can be attached or otherwise provided on the fabric 470, 472 for connecting each of these touch sensors or objects 480.

Figure 27:
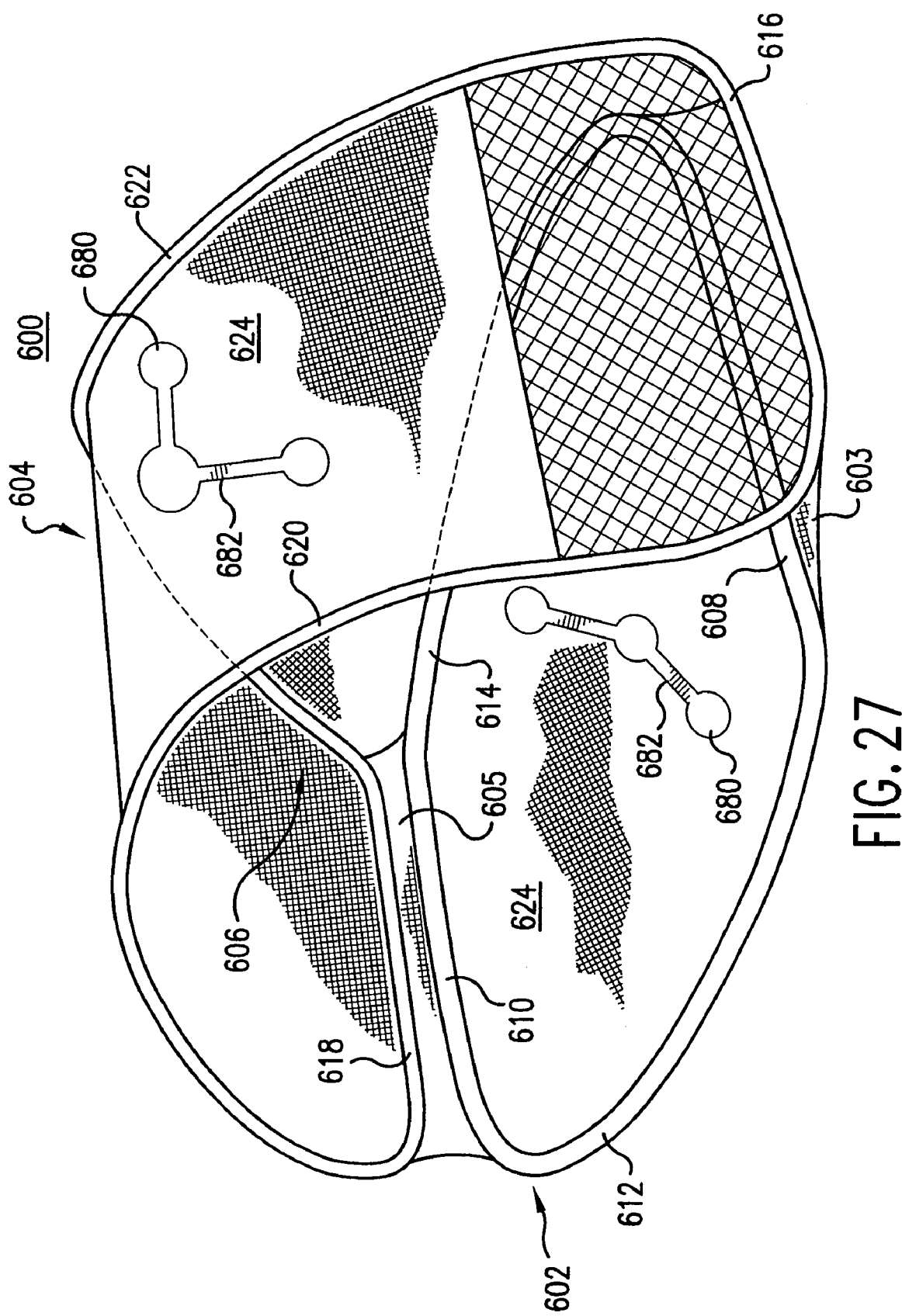
FIGS. 27-29 are perspective views of collapsible structures according to different embodiments of the present invention.

FIG. 27 illustrates a structure 600 that is almost identical to the structure 20 shown and described in FIG. 1A of U.S. Pat. No. 6,098,349 to Zheng, whose entire disclosure is hereby incorporated by this reference as though fully set forth herein. The difference between structure 600 in FIG. 27 and the structure 20 in FIG. 1A of U.S. Pat. No. 6,098,349 is that touch sensors or objects 680 are attached to the outer and/or inner surfaces of the fabric 624 of the panels 602, 604. Conductive wiring or paths 682 can be attached or otherwise provided on the fabric 624 for connecting each of these touch sensors or objects 680.

In particular, FIG. 27 illustrates a collapsible structure 600 having two separate panels 602 and 604 that are coupled together to form an enclosed space 606. One panel 602 may be a base panel that is adapted to have one side resting on a ground or surface, and the other panel 604 may be a wall panel that spans and covers the enclosed space 606. The panel 602 has two opposing end edges 608 and 610, and two opposing side edges 612 and 614 that are connected to the end edges 608 and 610 to form a generally four-sided configuration. The panel 604 also has two opposing end edges 616 and 618, and two opposing side edges 620 and 622 that are connected to the end edges 616 and 618 to form a generally four-sided configuration that has been bent to form a U-shaped configuration. The end edges 608 and 610 of the panel 602 are coupled to the end edges 616 and 618, respectively, of the panel 604 via any number of known methods. For example, the end edges 608 and 610 can be directly stitched to the end edges 616 and 618, respectively. Alternatively, the end edges 616 and 618 can be stitched to the fabric 624 of the base panel 602 at locations offset from the end edges 608 and 610 of the base panel 602. These alternatives are illustrated in U.S. Pat. No. 6,098,349. As yet a further alternative, two interconnecting fabric pieces 603 and 605 can be stitched to the end edges 608, 610 and 616, 618 of the panels 602 and 604, respectively, as shown in FIG. 27. Although illustrated as being generally four-sided in nature, the panels 602 and 604 can assume any configuration, such as circular, oval, rectangular, square, trapezoidal, or irregular.

As with the panels 22 described above, each panel 602, 604 has a continuous frame retaining sleeve provided along and traversing the edges of its sides. A continuous frame member (which can be the same as frame member 28) is retained or held within each frame retaining sleeve to support the respective panel 602, 604. Fabric or sheet material 624 (which can be the same as fabric 30) extends across each panel 602, 604 and is held taut by the respective frame members when each panel is in its open position.

Thus, the flexible and coilable nature of the frame members allows the wall panel 604 to be flexed so that its end edges 616 and 618 can be positioned at or adjacent the end edges 608 and 610 of the base panel 602. In this regard, the flexing of the wall panel 604 obviates the need to otherwise provide a plurality (e.g., at least three) of separate panels to enclose the space 606. The base panel 602 functions to hold the wall panel 604 in its flexed configuration. The structure 600 can be folded and collapsed by pushing the base panel 602 against the wall panel 604 to form one stack of panels 602, 604 that can be twisted and folded in accordance with the steps shown in FIGS. 3C through 3E.

Figure 28:
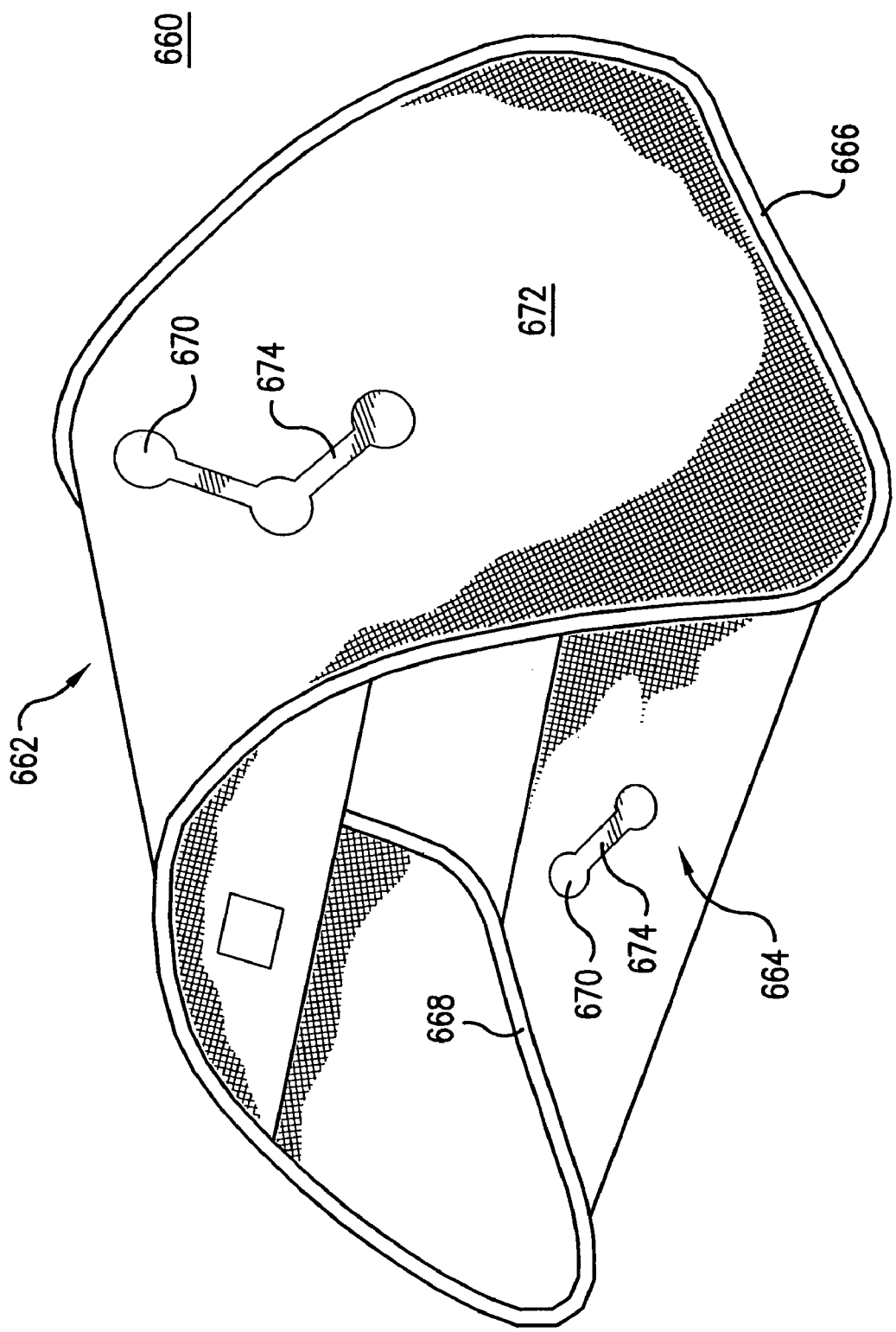

FIG. 28 illustrates a structure 660 that includes modifications from the structure 600 of FIG. 27. For example, the base panel is omitted from FIG. 28, so that the wall panel 662 is the only panel. In place of the base panel, a fabric or material 664 extends between and couples the end edges 666, 668 to hold the wall panel 662 in its flexed configuration. Touch sensors or objects 670 are attached to the outer and/or inner surfaces of the fabric 672 of the panel 662, or the fabric 664. Conductive wiring or paths 674 can be attached or otherwise provided on the fabric 672 or 664 for connecting each of these touch sensors or objects 670.

Figure 29:
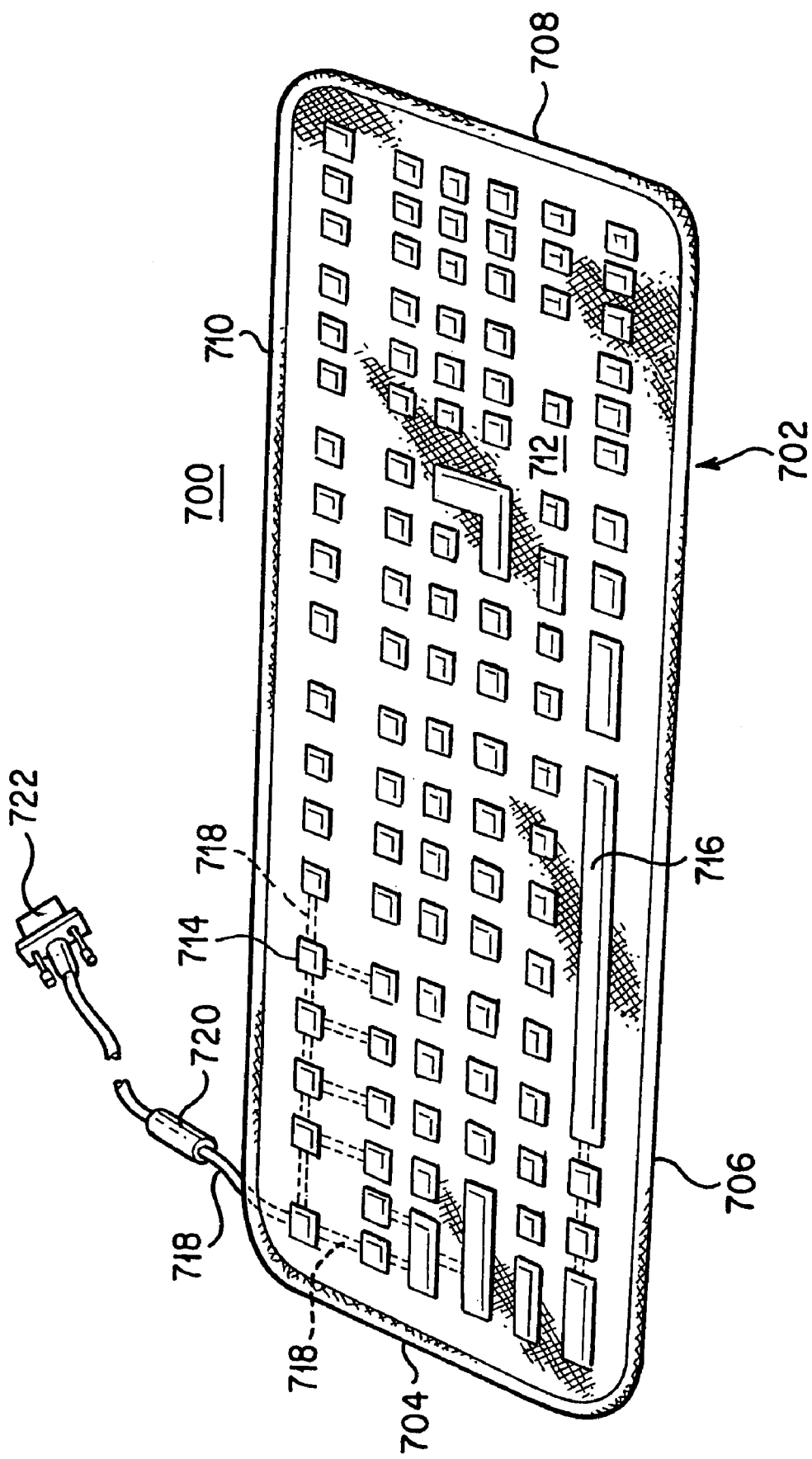
Figure 30:
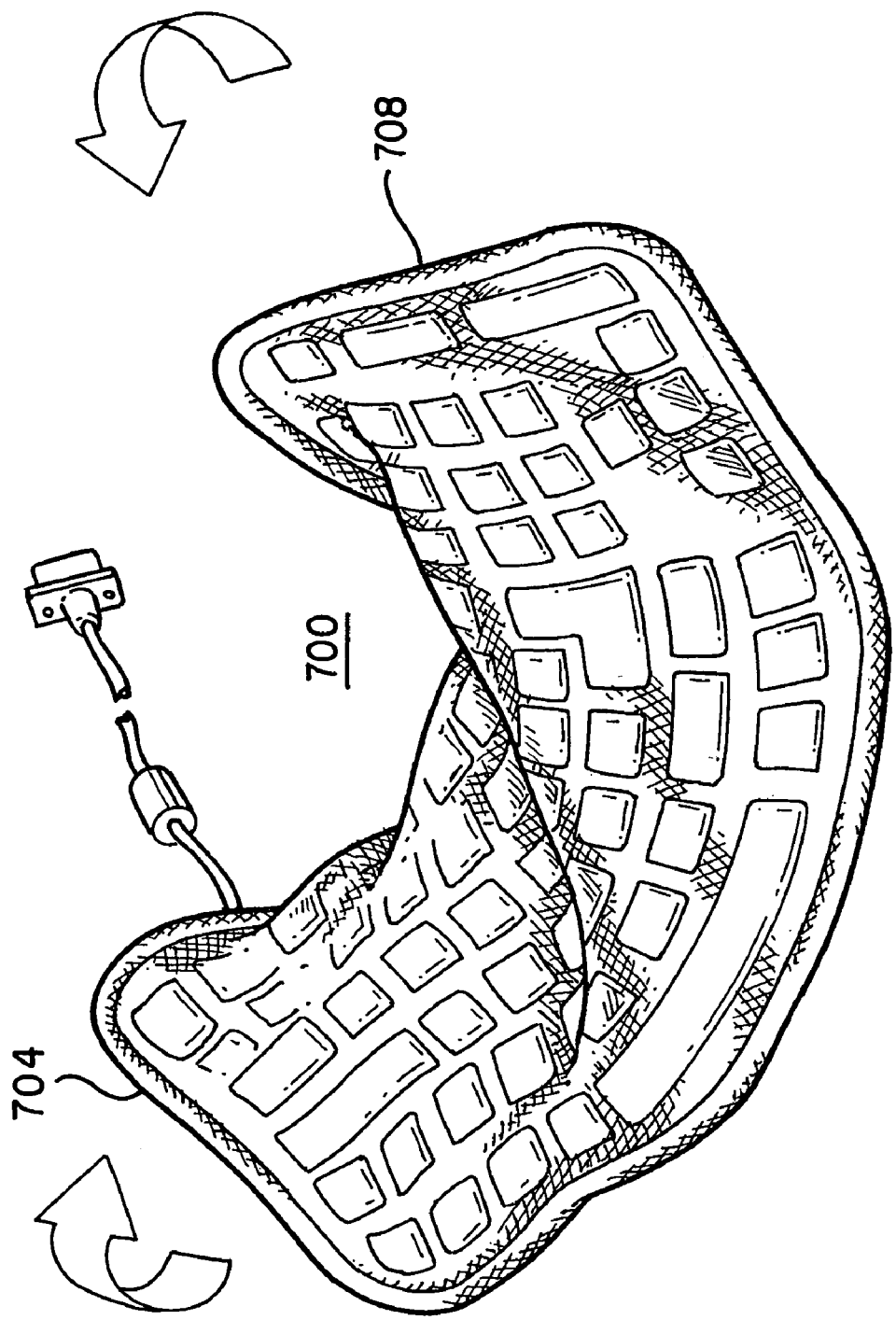
FIG. 30 illustrates how the structure of FIG. 29 may be twisted and folded for compact storage.

FIGS. 29 and 30 illustrate another embodiment of the present invention, where a single panel 702 (which can be similar in construction as the panel 400 in FIG. 9A) is used as a keyboard 700. The panel 702 can have four sides 704, 706, 708, 710, and has a top surface of the fabric 712 having a plurality of touch sensors 714 that can be arranged to operate as the keys for a keyboard. For example, one of the touch sensors 716 can even be elongated to function as a space bar. These touch sensors 714, 716 can be interconnected by conductive wiring or paths 718, some of which are shown in FIG. 29. A cable 720 can be coupled to one of the conductive paths 718, with the cable 720 carrying a plug 722 that is adapted to interface with a port from a personal computer. Referring to FIG. 30, the keyboard 700 can be twisted and folded in the same manner as the other panels illustrated herein. For example, the opposite borders (e.g., sides 704 and 708) of the panel 702 are folded in to collapse the frame member of the panel 702. Then, the steps illustrated in FIGS. 3D and 3E can be used to complete the folding of the panel 702 to a smaller configuration.

Thus, the embodiments of the present invention increase the applications and use of the collapsible structures to provide the user with an unlimited source and variety of fun and entertainment. The enhancements and features allow numerous functions, operations, and games to be utilized or played in connection with the collapsible structures, and significantly extends the useful applications of the basic collapsible structure.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A collapsible keyboard, comprising:
   a foldable frame member having a folded and an unfolded orientation, with a fabric material covering portions of the frame member to form a panel when the frame member is in the unfolded orientation;
   a cable extending from the panel;
   a plurality of touch sensors provided on the panel; and
   an electrical coupling that couples the touch sensors to the cable;
   wherein the frame member is twisted and folded to its folded orientation reduce the overall size of the frame member.

2. The structure of claim 1, wherein the electrical coupling includes at least one conductive path.

3. The structure of claim 1, wherein the electrical coupling includes at least one wire.

4. The structure of claim 3, further including a sleeve attached to the fabric material for retaining a portion of the at least one wire.

5. The structure of claim 1, further including a frame retaining sleeve coupled to the fabric material for retaining the frame member.

6. A collapsible keyboard, comprising:
   a foldable frame member having a folded and an unfolded orientation, with a fabric material covering portions of the frame member to form a panel when the frame member is in the unfolded orientation;
   a cable extending from the panel;
   a plurality of touch sensors provided on the panel;
   an electrical coupling that couples the touch sensors to the cable, the electrical coupling including at least one wire; and
   a sleeve attached to the fabric material for retaining a portion of the at least one wire.

* * * * *